US008552354B2

(12) United States Patent
Hirotsu et al.

(10) Patent No.: US 8,552,354 B2
(45) Date of Patent: Oct. 8, 2013

(54) SOLID-STATE IMAGE PICKUP ELEMENT HAVING A CONTROL CIRCUIT FOR CONTROLLING THE OPERATION PERIOD OF A TRANSFER CIRCUIT AND METHOD FOR CONTROLLING THE SAME

(75) Inventors: Ayako Hirotsu, Fukuoka (JP); Fusayoshi Hirotsu, Fukuoka (JP)

(73) Assignee: Kazuko Hirotsu, Fukuoka (JP)

( * ) Notice: Subject to any disclaimer, the term of this patent is extended or adjusted under 35 U.S.C. 154(b) by 268 days.

(21) Appl. No.: 13/142,228

(22) PCT Filed: Dec. 25, 2009

(86) PCT No.: PCT/JP2009/071540
§ 371 (c)(1),
(2), (4) Date: Jun. 24, 2011

(87) PCT Pub. No.: WO2010/074199
PCT Pub. Date: Jul. 1, 2010

(65) Prior Publication Data
US 2011/0260038 A1    Oct. 27, 2011

(30) Foreign Application Priority Data

Dec. 26, 2008  (JP) ................................ 2008-333535
May 21, 2009   (JP) ................................ 2009-123297

(51) Int. Cl.
*H01L 27/00* (2006.01)
(52) U.S. Cl.
USPC .................................... 250/208.1; 250/214 R
(58) Field of Classification Search
USPC ........................... 250/208.1, 214 R, 214 SW;
348/303–320; 257/290–292, 232, 245
See application file for complete search history.

(56) References Cited

U.S. PATENT DOCUMENTS

| 6,486,460 B1 | 11/2002 | Murakami et al. |
| 7,397,020 B2 * | 7/2008 | Roh ............................ 250/208.1 |
| 2006/0221667 A1 | 10/2006 | Ogura et al. |
| 2008/0012973 A1 | 1/2008 | Park et al. |

FOREIGN PATENT DOCUMENTS

| JP | 2000-92395 A | 3/2000 |
| JP | 2000-340779 A | 12/2000 |
| JP | 2004-159274 A | 6/2004 |
| JP | 2004-363666 A | 12/2004 |

(Continued)

OTHER PUBLICATIONS

International Search Report of PCT/JP2009/071540, date of mailing Feb. 2, 2010.

(Continued)

*Primary Examiner* — Que T Le
(74) *Attorney, Agent, or Firm* — Westerman, Hattori, Daniels & Adrian, LLP

(57) ABSTRACT

A transfer circuit is configured to transfer signal charges of an accumulating region to a floating diffusion region when being operated, while being configured to stop the transfer of the signal charges when not being operated, by use of a transfer gate which is turned on and off in response to a transfer control signal. The pixel control circuit controls the transfer circuit according to a light receiving level of a pixel circuit so as to extend an operation period of the pixel circuit in a case where a light receiving quantity is not lower than a predetermined quantity, contrary to a case where the light receiving quantity is lower than the predetermined quantity.

16 Claims, 20 Drawing Sheets

(56) References Cited

FOREIGN PATENT DOCUMENTS

| | | |
|---|---|---|
| JP | 2006-41866 A | 2/2006 |
| JP | 2006-74663 A | 3/2006 |
| JP | 2006-148328 A | 6/2006 |
| JP | 2008-72512 A | 3/2008 |
| WO | 2008-133861 A1 | 11/2008 |

OTHER PUBLICATIONS

Extended European Search Report dated Nov. 27, 2012, issued in corresponding European Patent Application No. 09834995.4 (10 pages).

Japanese Office Action dated Jul. 16, 2013, issued in corresponding Japanese application No. 2009-274560.

* cited by examiner

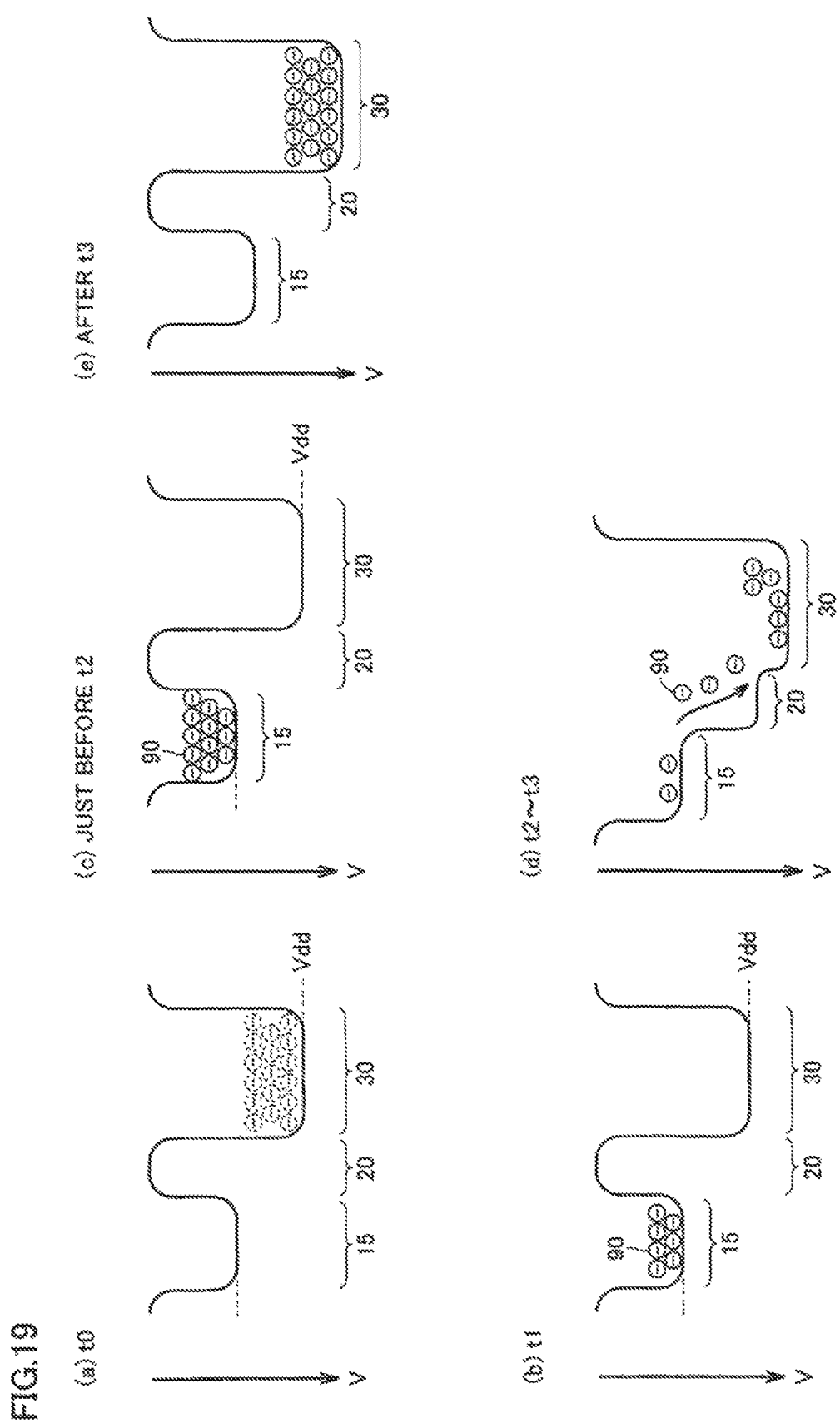

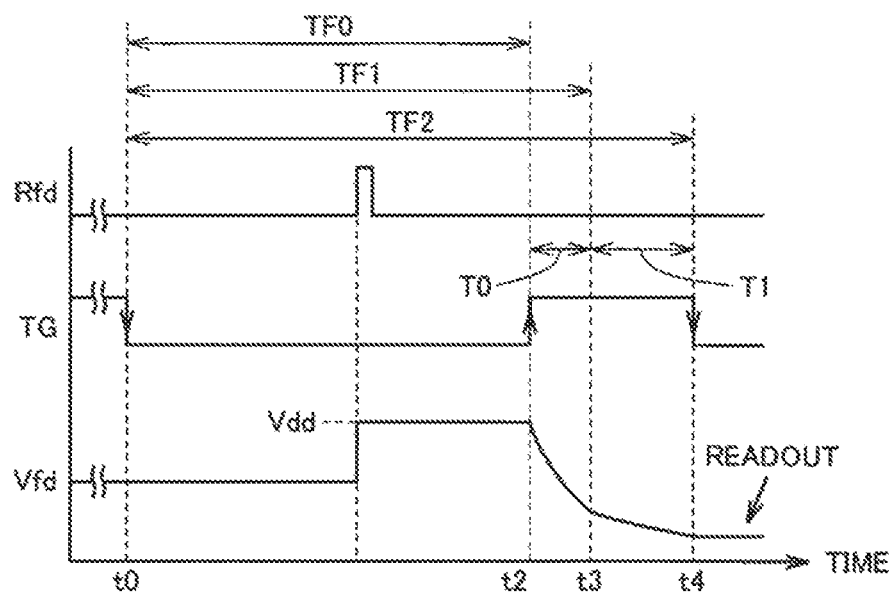

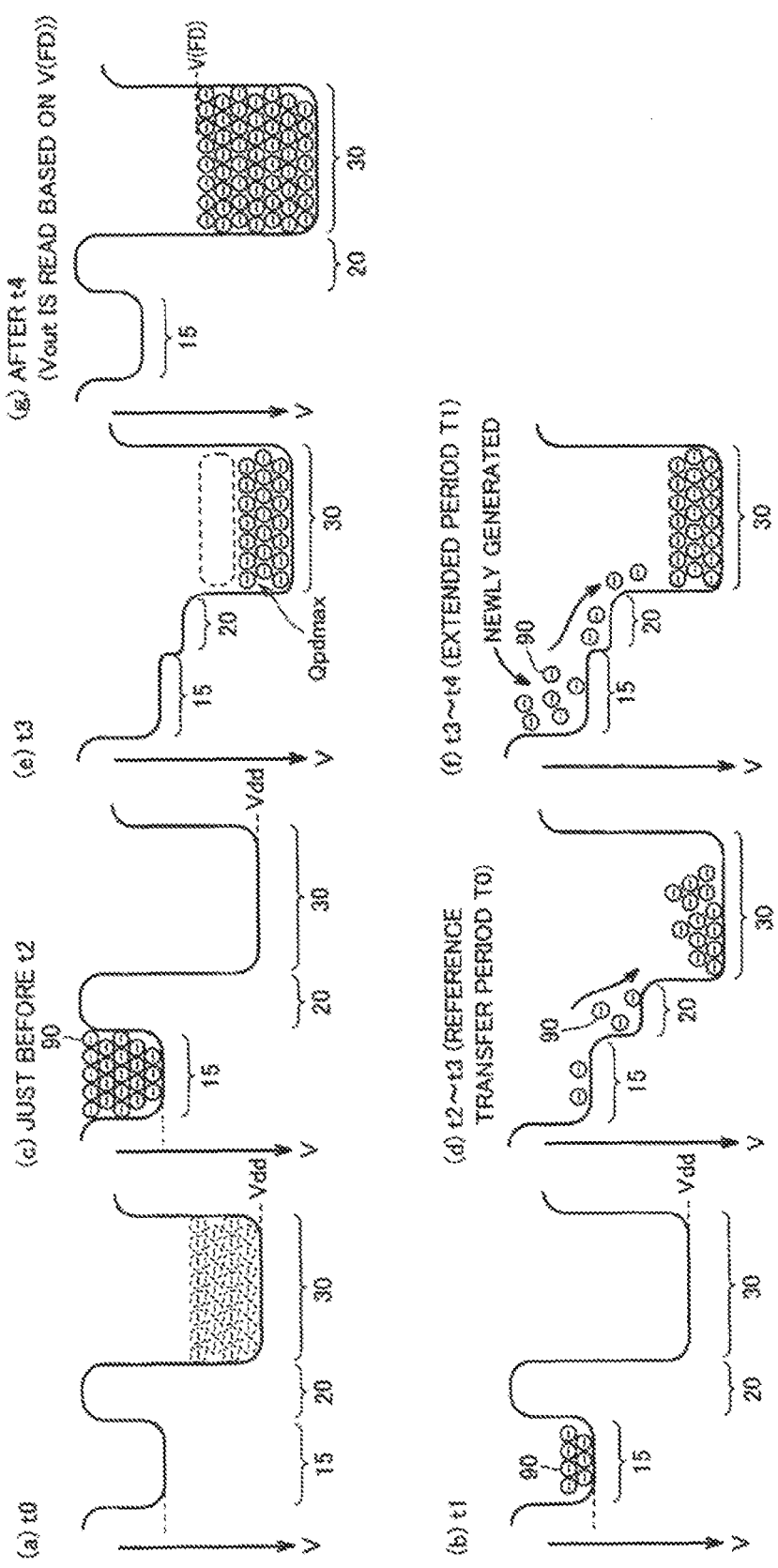

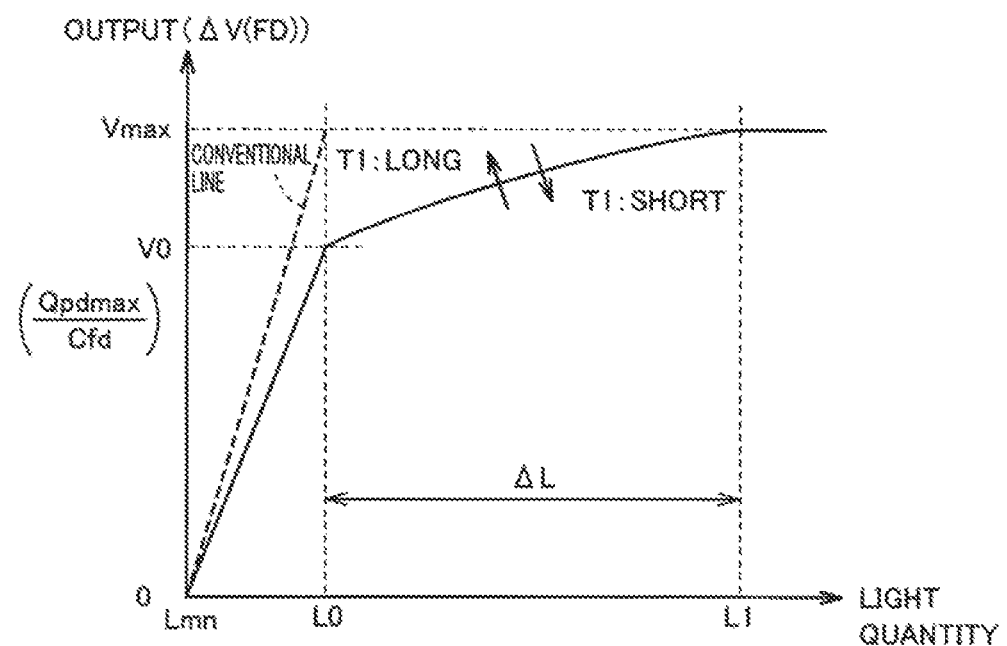

SOLID-STATE IMAGE PICKUP ELEMENT HAVING A CONTROL CIRCUIT FOR CONTROLLING THE OPERATION PERIOD OF A TRANSFER CIRCUIT AND METHOD FOR CONTROLLING THE SAME

TECHNICAL FIELD

The present invention relates to a solid-state image pickup element and a method for controlling the same, and more particularly, to expansion of a dynamic range of the solid-state image pickup element.

BACKGROUND ART

A solid-state image pickup element such as a CCD (Charge-coupled device) and CMOS (Complementary metal-oxide semiconductor) imager, comes to be built in a mobile phone as well as in a video camera and a digital camera, and it is widely used as an inexpensive and low-power-consumption image sensing device.

However, a sensing ability of the solid-state image pickup element is considerably inferior to that of a human being. A contrast between a bright part and a dark part can be sufficiently detected by a human visual sense even when there is a four to five-digit luminance distribution in one visual field. This excellent contrast sensing ability is implemented by a function in which a light receiving cell in the retina can adjust its light sensing characteristics with respect to each cell.

Meanwhile, it is difficult for a conventional solid-state image pickup element to obtain sufficient contrast between a bright part and a dark part in a visual field where there is a considerable difference in brightness in the visual field when an image is picked up at certain timing. That is, when the image is picked up based on one of the bright part and the dark part, brightness of the opposite part is difficult to keep sufficient contrast.

Therefore, Japanese Patent Laying-Open No. 2000-340779 (patent document 1) discloses a semiconductor image pickup element in which a dynamic range is expanded by providing a mechanism capable of shifting a light sensitivity range in each pixel circuit, based on an incident light quantity to peripheral pixels.

In addition, Japanese Patent Laying-Open No. 2004-159274 (patent document 2) discloses a configuration to expand a dynamic range by extracting a low illuminance signal based on long-time accumulation and a high illuminance signal based on short-time accumulation from a pixel circuit to prevent light charges from being saturated in high illuminance, while keeping a configuration of the pixel circuit simple. Similarly, Japanese Patent Laying-Open No. 2004-363666 (patent document 3) discloses that a wide dynamic range imaging condition is dynamically revised to execute adaptive control of a dynamic range by independently extracting a low illuminance signal based on long-time light charge accumulation, a medium illuminance signal based on short-time light charge accumulation, and a high illuminance signal based on ultra-short-time light charge accumulation, and combining those signals through a signal process in a subsequent stage.

CITATION LIST

Patent Literature

PTL 1: Japanese Patent Laying-Open No. 2000-340779
PTL 2: Japanese Patent Laying-Open No. 2004-159274
PTL 3: Japanese Patent Laying-Open No. 2004-363666

SUMMARY OF INVENTION

Technical Problem

However, the configuration disclosed in the patent document 1 needs to arrange two light detector elements such as a first light detector element to detect a light receiving quantity of itself in each pixel circuit, and a second light detector element connected to another pixel circuit through a resistor element to detect an average light receiving quantity in adjacent pixels. Therefore, it could be difficult to realize miniaturization of the pixel circuit, which is required to apply to a mobile type device especially.

In addition, according to the patent documents 2 and 3, the pixel circuit can be miniaturized, but complexity could be introduced into control for a transfer gate to transfer a signal charge generated by a light detector element to a floating diffusion region, and into a process of a signal read from the pixel circuit in a subsequent stage.

That is, it was difficult to expand the dynamic range without complicating the control of the pixel circuit and arithmetic processing in a subsequent stage of the pixel circuit while miniaturizing the pixel circuit.

The present invention was made to solve the above problems, and it is an object of the present invention to provide a solid-state image pickup element in which a dynamic range can be expanded without complicating a configuration of a pixel circuit or control of the pixel circuit and/or arithmetic processing in a subsequent stage of the pixel circuit.

Solution to Problem

A solid-state image pickup element according to the present invention includes a pixel circuit and pixel controlling means for controlling transfer of a signal charge in the pixel circuit. The pixel circuit includes a light detector element generating the signal charge in response to light reception, an accumulating region accumulating the signal charges generated by the light detector element, a floating diffusion region, and a transfer circuit configured to transfer the signal charges in the accumulating region to the floating diffusion region when being operated, while being configured to stop the transfer when not being operated. The pixel controlling means controls the transfer circuit based on a light receiving level of the pixel circuit so as to extend an operation period of the transfer circuit in a case where a light receiving quantity is not less than a predetermined quantity, compared to a case where the light receiving quantity is lower than the predetermined quantity.

Preferably, the pixel controlling means operates the transfer circuit for a predetermined period, and extends the operation of the transfer circuit beyond the predetermined period when a signal charge quantity transferred to the floating diffusion region during the predetermined period is larger than a reference quantity, while inactivates the transfer circuit at the end of the predetermined period when the transferred signal charge quantity is not larger than the reference quantity.

A method for controlling a solid-state image pickup element according to the present invention, with respect to the pixel circuit configuration as described above, includes a step of accumulating the signal charges generated by the light detector element in the accumulating region while the transfer circuit is not operated, a step of transferring the signal charges accumulated in the accumulating region in the step of accumulating to the floating diffusion region by operating the transfer circuit for a predetermined period at certain timing, and a step of additionally transferring the signal charges generated by the light detector element after the predetermined period to the floating diffusion region by extending the operation of the transfer circuit beyond the predetermined period when the signal charge quantity transferred to the floating diffusion region during the predetermined period is larger than a reference quantity.

According to another aspect of the present invention, a solid-state image pickup element includes a plurality of pixel circuits, and a control circuit controlling each of the pixel circuits. Each pixel circuit includes a light detector element generating a signal charge in response to light reception, an accumulating region accumulating the signal charges generated by the light detector element, a floating diffusion region, and a transfer circuit configured to transfer the signal charges in the accumulating region to the floating diffusion region when being operated, while being configured to stop the transfer when not being operated. The control circuit is configured to control a transfer gate of each of the pixel circuits so as to operate the transfer gate during a complete transfer period required for the transfer gate to transfer a maximum signal charge accumulative quantity in the accumulating region from the accumulating region to the floating diffusion region, and so as to continue to operate the transfer gate during a first period after the complete transfer period. A capacitance value of the floating diffusion region is not less than a sum of a first capacitance value required to receive the maximum signal charge accumulative quantity, and a second capacitance value required to receive the signal charge generated by the light detector element during the first period.

According to another aspect of the present invention, a method for controlling a solid-state image pickup element, with respect to each of the pixel circuits provided as described above, includes a step of accumulating the signal charges generated by the light detector element in the accumulating region while the transfer gate is in an off state, a step of keeping on the transfer gate during a complete transfer period required for the transfer gate to transfer a maximum signal charge accumulative quantity in the accumulating region from the accumulating region to the floating diffusion region, and a step of additionally transferring the signal charges generated by the light detector element after the step of keeping-on, to the floating diffusion region by keeping on the transfer gate during a first period after the complete transfer period. Thus, a capacitance value of the floating diffusion region is not less than a sum of a first capacitance value required to receive the maximum signal charge accumulative quantity, and a second capacitance value required to receive the signal charges generated by the light detector element during the first period.

Advantageous Effects of Invention

According to the present invention, the solid-state image pickup element has an expanded dynamic range without complicating control of the pixel circuit and/or arithmetic processing in a subsequent stage of the pixel circuit under the simple pixel circuit configuration. As a result, the solid-state image pickup element can be produced at low cost while being miniaturized so as to be mounted in a mobile device and realizing an expanded dynamic range.

BRIEF DESCRIPTION OF DRAWINGS

FIGS. 19(a)-(e) are conceptual diagrams to describe the conventional control operation of the pixel circuit shown in FIG. 17.

FIG. 20 is a waveform diagram to describe a control operation of the pixel circuit in the solid-state image pickup element according to the sixth embodiment.

FIGS. 21(a)-(g) are conceptual diagrams to describe the control operation of the pixel circuit in the solid-state image pickup element according to the sixth embodiment.

FIG. 22 is a conceptual diagram to describe output characteristics of the pixel circuit in the solid-state image pickup element according to the sixth embodiment.

DESCRIPTION OF EMBODIMENTS

Figure 1:
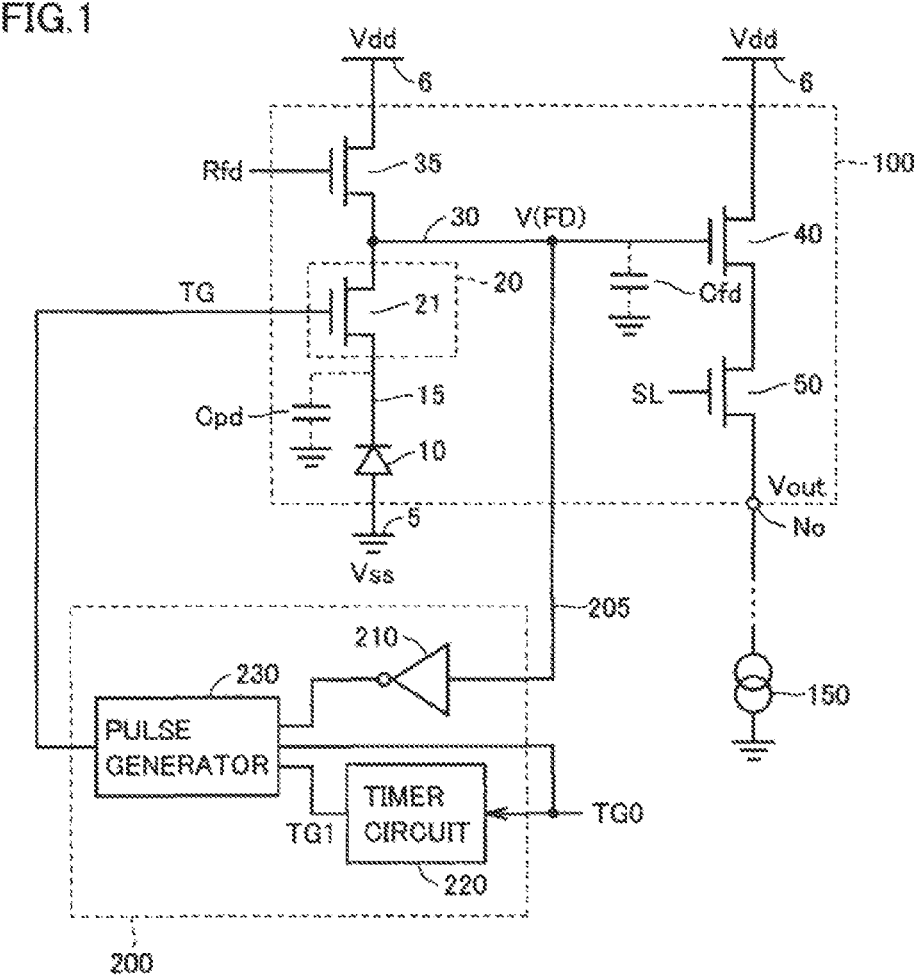
FIG. 1 is a circuit diagram showing configurations of a pixel circuit and a pixel control circuit according to a first embodiment of the present invention.

Embodiments of the present invention will be described in detail with reference to the drawings hereinafter. In addition, the same references are allotted to the same or corresponding parts in the drawings and their descriptions will not be repeated.

First Embodiment

FIG. 1 is a circuit diagram showing constitutions of a pixel circuit and a pixel control circuit according to a first embodiment of the present invention.

Referring to FIG. 1, a pixel circuit 100 includes a photodiode 10 serving as a "light detector element", an accumulating region 15, a transfer circuit 20, a floating diffusion region 30, a reset switch 35, a transistor 40 serving as an "amplifier", and a pixel selector switch 50.

Photodiode 10 is provided between a ground node 5 supplying a ground potential Vss, and transfer circuit 20. In an example shown in FIG. 1, an anode of photodiode 10 is connected to ground node 5, and a cathode of photodiode 10 serves as accumulating region 15 for a signal charge generated by photodiode 10. That is, in the example shown in FIG. 1, the signal charge is an electron (negative charge) serving as a majority carrier in the cathode (n type). Predetermined capacitance Cpd is provided in accumulating region 15 due to parasitic capacitance. In a general pixel configuration, a light receiving area of photodiode 10 can be ensured as much as possible within layout limitations, so that capacitance Cpd of accumulating region 15 can be ensured to some extent. A maximum signal charge quantity which can be accumulated in accumulating region 15 is determined depending on capacitance Cpd.

Transfer circuit 20 is configured by a transfer gate 21 connected between accumulating region 15 and floating diffusion region 30. Transfer gate 21 is configured by a transistor which is turned on or off by a transfer control signal TG. In the example shown in FIG. 1, transfer gate 21 is configured by an n-type transistor.

Transfer gate 21 is turned on or off in response to transfer control signal TG. During an on period of transfer gate 21, the signal charge is transferred from accumulating region 15 to floating diffusion region 30, and transfer circuit 20 is operated. Meanwhile, during an off period of transfer gate 21, the transfer of the signal charge from accumulating region 15 to floating diffusion region 30 is not performed, and transfer circuit 20 is not operated.

Reset switch 35 electrically connects floating diffusion region 30 to a power supply node 6 supplying a power supply potential Vdd as a reset potential, in response to a reset signal Rfd. That is, when reset switch 35 is turned on, the signal charges (negative charges) existing in floating diffusion region 30 are withdrawn to ground node 5 and the signal charge quantity accumulated in floating diffusion region 30 is cleared (reset). In addition, as the reset potential, a potential different from power supply potential Vdd may be used.

Floating diffusion region 30 has also predetermined capacitance Cfd due to parasitic capacitance. Capacitance Cfd of floating diffusion region 30 is preferably as small as possible to the extent that the capacitance can receive a supposed maximum value of the signal charge quantity transferred by transfer gate 21. Because, as capacitance Cfd becomes small, a difference in FD potential V (FD) generated according to a difference in signal charge quantity of floating diffusion region 30 becomes large, thereby improving detection sensitivity.

Pixel selector switch 50, and transistor 40 serving as the amplifier are connected in series between power supply node 6 and an output node No of pixel circuit 100. For example, pixel selector switch 50 is configured by an n-type transistor which is turned on in response to a pixel selection signal SL. When pixel selector switch 50 is turned on, a path is formed from power supply node 6 to ground node 5 through transistor 40, pixel selector switch 50, output node No, a data line (not shown), and a current supply 150.

A gate of transistor 40 is connected to floating diffusion region 30. As a result, during an on period of pixel selector switch 50, transistor 40 serves as a source follower amplifier, and generates an electric signal having a potential according to a potential of floating diffusion region 30. This electric signal is outputted to output node No through pixel selector switch 50. That is, the electric signal outputted from the "amplifier" configured by transistor 40 can be extracted from output node No through turned-on pixel selector switch 50.

In addition, according to this embodiment, power supply potential Vdd and ground potential Vss have a relationship such that Vdd>Vss, and they can be set to optional potentials, respectively, as long as bias required for a circuit operation can be applied due to a potential difference (Vdd−Vss). That is, it is to be noted that ground potential Vss also can be set to the optional potential (including negative potential) other than the ground potential.

A pixel control circuit 200 includes a path 205 used to feed back the potential of floating diffusion region 30, an inverting amplifier circuit 210 generating a signal based on the potential of floating diffusion region 30, a timer circuit 220, and a pulse generator 230.

Figure 2:
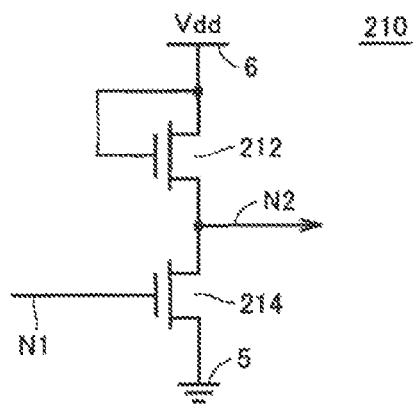
FIG. 2 is a circuit diagram showing a configuration example of a inverting amplifier circuit shown in FIG. 1.

FIG. 2 is a view showing a circuit configuration of inverting amplifier circuit 210.

Referring to FIG. 2, inverting amplifier circuit 210 includes transistors 212 and 214 connected in series between ground node 5 and power supply node 6. A gate of transistor 212 is connected to power supply node 6, so that transistor 212 functions as a resistor element. Therefore, inverting amplifier circuit 210 outputs a signal having ground potential Vss (logical low level, hereinafter, referred to as "L level" simply) to an output node N2 when the potential of an input node N1 connected to a gate of transistor 214 exceeds a predetermined potential corresponding to a threshold voltage of transistor 214. Meanwhile, inverting amplifier circuit 210 outputs a signal having power supply potential Vdd (logical high level, hereinafter referred to as "H level" simply) to node N2 when the potential of input node N1 is lower than the predetermined potential. Input node N1 is connected to feed-back path 205 shown in FIG. 1. Output node N2 is connected to pulse generator 230 shown in FIG. 1.

Referring to FIG. 1 again, inverting amplifier circuit 210 outputs the H-level signal when the potential V (FD) (hereinafter, referred to FD potential occasionally) of floating diffusion region 30 is lower than a reference potential, while it outputs the L-level signal when FD potential V (FD) is not lower than the reference potential.

After being reset to power supply potential Vdd, FD potential V (FD) decreases as the accumulated signal charge quantity increases, so that FD potential V (FD) becomes relatively low when the light receiving quantity of pixel circuit 100 is large, while it becomes relatively high when the light receiving quantity is small. Therefore, inverting amplifier circuit 210 can be configured so as to output the H-level signal when the signal charge quantity of floating diffusion region 30 is larger than a reference quantity, and output the L-level signal when the signal charge quantity is not larger than the reference quantity, based on a design of inverting amplifier circuit 210 (threshold voltage of transistor 214).

Timer circuit 220 generates a control signal TG1 set so as to keep on for a predetermined period after generation of a transfer control reference signal TG0, based on transfer control reference signal TG0 to determine an original operation period of transfer circuit 20. Pulse generator 230 receives signals TG0 and TG1, and the output signal of inverting amplifier circuit 210, that is, the signal showing whether or not the signal charge quantity of floating diffusion region 30 is larger than the reference quantity, and generates transfer control signal TG to be applied to the gate of transfer gate 21.

In addition, inverting amplifier circuit 210 may be provided inside pulse generator 230. That is, as another configuration, FD potential V (FD) is directly inputted to pulse generator 230, and the signal showing whether or not FD potential V (FD) is lower than the reference potential, that is, whether or not the signal charge quantity of floating diffusion region 30 is larger than the reference quantity is generated inside pulse generator 230.

Next, a description will be made of operations of pixel circuit 100 and pixel control circuit 200 with reference to FIGS. 3 and 4.

Figure 3:
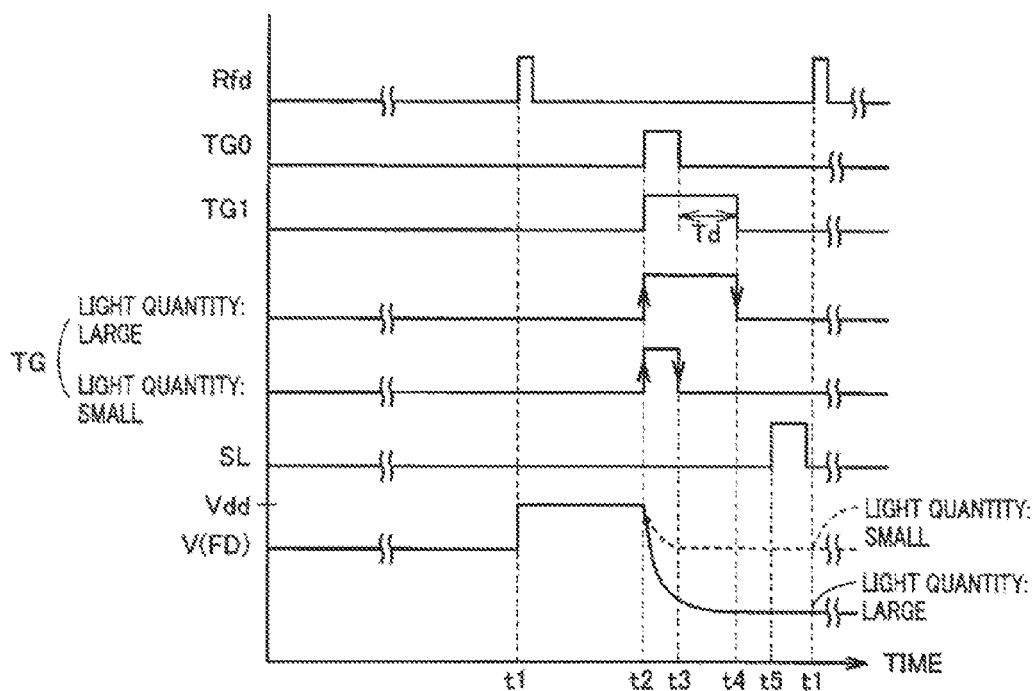
FIG. 3 is a waveform diagram to describe control operations of the pixel circuit and the pixel control circuit according to the first embodiment.
Figure 4:
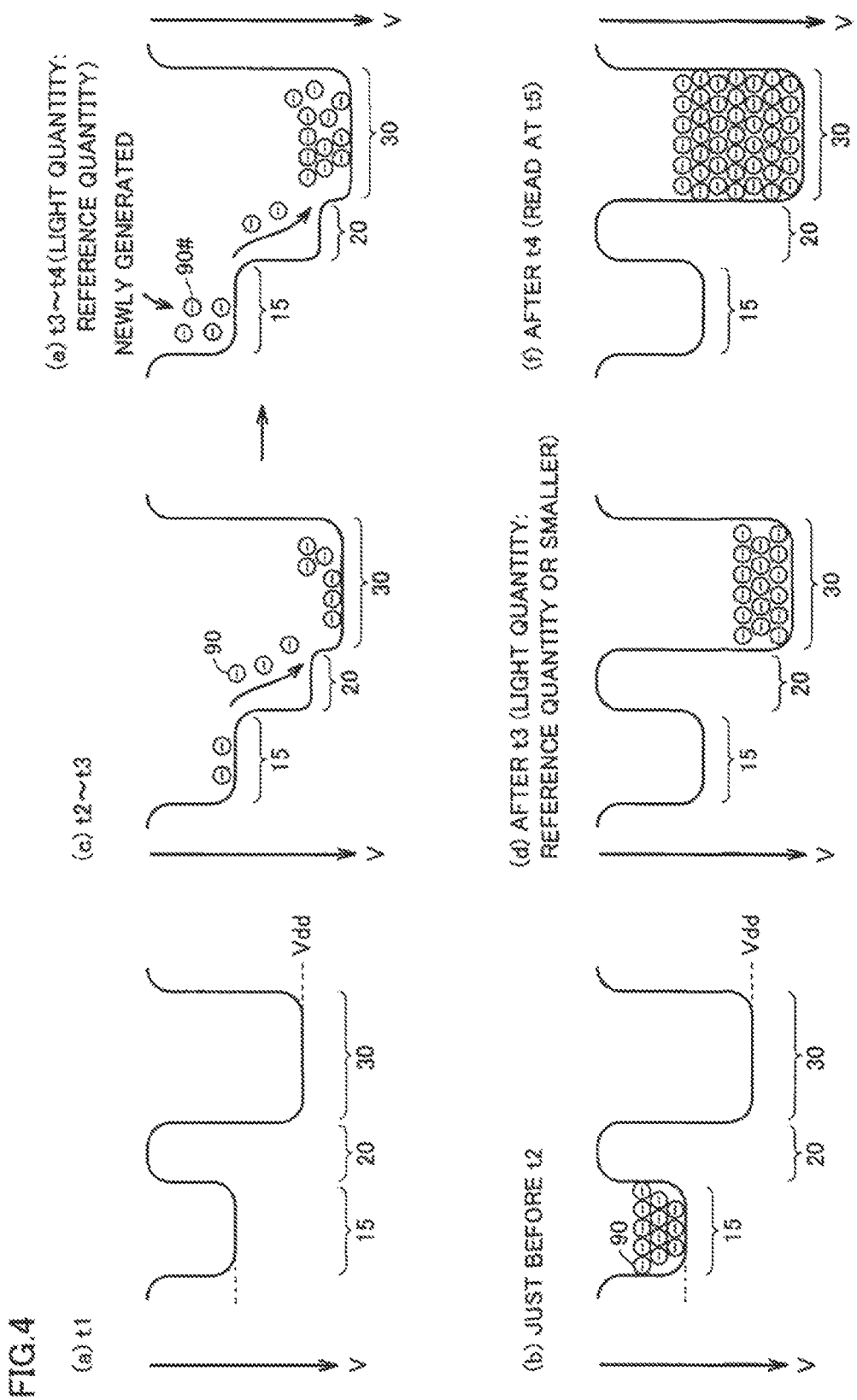
FIGS. 4(a)-(f) are conceptual diagrams to describe the pixel circuit and its control operation according to the first embodiment.

Referring to FIG. 3, reset signal Rfd is generated at a time t1, and reset switch 35 is turned on. Thus, FD potential V (FD) is reset to power supply potential Vdd. In this state, as shown in FIG. 4(a), the signal charge does not exist in floating diffusion region 30. Thus, since transfer gate 21 is in an off state (transfer circuit 20 is not operated), a potential barrier exists between accumulating region 15 and floating diffusion region 30, so that even when the signal charge exists in accumulating region 15, it is not transferred to floating diffusion region 30.

Referring to FIG. 3 again, the signal charges are generated by photodiode 10 as pixel circuit 100 receives light and accumulated in accumulating region 15. Thus, just before a time t2 to generate transfer control reference signal TG0, as shown in FIG. 4(b), signal charges 90 having a quantity based on the light receiving quantity of pixel circuit 100 generated so far are accumulated in accumulating region 15.

Referring to FIG. 3 again, transfer control reference signal TG0 is set so as to keep on transfer gate 21 during times t2 to t3. Thus, as shown in FIG. 4(c), as the potential barrier provided between accumulating region 15 and floating diffusion region 30 is lowered by the operation of transfer circuit 20, the signal charges accumulated in accumulating region 15 until time t2 are transferred to floating diffusion region 30. In addition, a length of the period between times t2 to t3 (set period of transfer control reference signal TG0) is set in general so as to correspond to a minimum time required to transfer the signal charges accumulated in accumulating region 15 until time t2 similar to general control of the pixel circuit.

As shown in FIG. 3, as the signal charges are transferred to floating diffusion region 30, FD potential V (FD) changes. As the light receiving quantity of pixel circuit 100 increases, i.e., as the transferred signal charge quantity increases, a reduction amount in FD potential V (FD) increases.

According to this embodiment, pixel control circuit 200 generates transfer control signal TG, based on a light receiving level of pixel circuit 100, more specifically, in such a manner that an operation period of transfer circuit 20 is extended beyond time t3 in the case where the light receiving quantity is not smaller than the predetermined quantity, compared to the case where the light receiving quantity is smaller than the predetermined quantity. That is, pulse generator 230 (FIG. 1) generates transfer control signal TG to change the on period of transfer gate 21, based on FD potential V (FD) at time t3.

When FD potential V (FD) at time t3 is not lower than the reference potential, and the signal charge quantity of floating diffusion region 30 is not larger than the reference quantity, pulse generator 230 generates transfer control signal TG similar to transfer control reference signal TG0. As a result, transfer gate 21 is turned off at time t3, and transfer circuit 20 is not operated after a period of times t2 to t3, that is, its original operation period. In this case, as shown in FIG. 4(d), since the potential barrier is raised again by transfer circuit 20 after time t3, the transfer of the signal charge from accumulating region 15 to floating diffusion region 30 is stopped. At this time, as shown in FIG. 3, after time t3, FD potential V (FD) is maintained at the potential provided at time t3. Thus, when pixel selector switch 50 (FIG. 1) is turned on by pixel selection signal SL at a time t5, an output potential Vout corresponding to FD potential V (FD) is read from output node No.

Meanwhile, when ED potential V (FD) is lower than the reference potential and the signal charge quantity of floating diffusion region 30 is larger than the reference quantity at time t3, pulse generator 230 generates transfer control signal TG to extend the on period of transfer gate 21. More specifically, transfer control signal TG is generated so that the on period of transfer gate 21 is extended by an extended time Td set by timer circuit 220 (FIG. 1), that is so that the on state of transfer gate 21 is maintained during the H level period of control signal TG1.

Pulse generator 230 can be optionally designed by combining a flip-flop and/or a logic gate that receive a signal showing a comparison result between FD potential V (FD) and the reference potential at time t3 (output signal of inverting amplifier circuit 210 in FIG. 1), transfer control reference signal TG0, and control signal TG1. Alternatively, as described above, FD potential V (FD) may be directly inputted to pulse generator 230, and the signal showing the comparison result between FD potential V (FD) and the reference potential may be generated in pulse generator 230.

As a result, when the light receiving quantity of pixel circuit 100 is larger than the reference value, the on period of transfer gate 21 (operation period of transfer circuit 20) is extended, so that as shown in FIG. 4(e), signal charges 90# newly generated by photodiode 10 due to light reception at times t3 to t4 are also transferred to floating diffusion region 30 and accumulated therein. As a result, as shown in FIG. 3, FD potential V (FD) is further lowered after time t3. According to this embodiment, capacitance Cfd of floating diffusion region 30 in pixel circuit 100 is designed so as to be larger than a normal value, in order to receive the additional signal charge quantity due to the extension of the on period of transfer gate 21 (operation period of transfer circuit 20). Thus, as shown in FIG. 4(f), the potential barrier is raised again by transfer circuit 20 at time t4 after extended time Td from time t3, so that the transfer of the signal charge from accumulating region 15 to floating diffusion region 30 is stopped.

Thus, when pixel selector switch 50 (FIG. 1) is turned on by pixel selection signal SL at time t5, output potential Vout corresponding to FD potential V (FD) is read from output node No. In addition, the on period of pixel selector switch 50 can be optionally set as long as it includes the above reading timing (at time t5). For example, pixel selection signal SL may be generated in such a manner that the on state of pixel selector switch 50 can be maintained from before time t2 to just before the next reset timing (time t1).

Figure 5:
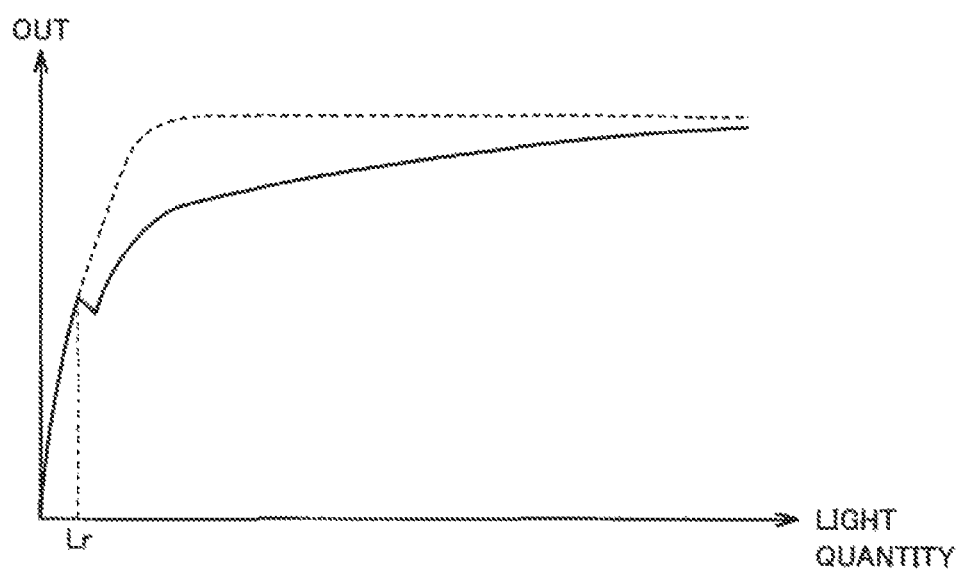
FIG. 5 is a view showing output characteristics of the pixel circuit according to the first embodiment of the present invention.

As a result, FIG. 5 shows light receiving characteristics of pixel circuit 100 provided by the pixel control according to the first embodiment. A horizontal axis in FIG. 5 shows the light receiving quantity (incident light quantity) of pixel circuit 100, and a vertical axis therein shows a pixel output signal OUT generated based on output potential Vout.

Pixel output signal OUT becomes high as the light receiving quantity increases, contrary to output potential Vout. That is, pixel output signal OUT shows a minimum value (0) when the light receiving quantity of pixel circuit 100 is zero and FD potential V (FD) is kept at the reset potential, and consequently output potential Vout=Vdd. Meanwhile, pixel output signal OUT show a maximum value when the light receiving quantity of pixel circuit 100 exceeds its limit and the signal charges of floating diffusion region 30 is saturated, and consequently output potential Vout=Vdd.

A reference light quantity Lr shown in FIG. 5 is a reference value showing a threshold value to determine whether or not the on period of transfer gate 21, that is, the operation period of transfer circuit 20 is extended. FD potential V (FD) provided when the signal charges are accumulated in floating diffusion region 30 by this reference light quantity Lr corresponds to the above-described reference potential of FD potential V (FD).

When the light quantity is not larger than the reference light quantity Lr, pixel circuit 100 provides pixel output signal OUT corresponding to the signal charge quantity accumulated until time 12 (in FIG. 2), according to a usual operation. That is, in a low illuminance region, change characteristics of pixel output signal OUT with respect to the light receiving quantity, that is, light receiving sensitivity characteristics can be sharply secured as usual.

Meanwhile, when the light quantity is larger than reference light quantity L1, pixel output signal OUT that reflects the signal charge quantity generated by photodiode 10 during the extended operation period of transfer circuit 20 (on period of transfer gate 21) can be formed. As a result, a change ratio of pixel output signal OUT with respect to the light quantity change can be enhanced in a high luminance region, compared with the conventional pixel control (shown by a dotted line in FIG. 5) in which capacitance Cfd of floating diffusion region 30 has a usual value (smaller than Cfd in pixel circuit 100 according to this embodiment) and pixel output signal OUT is generated, based on only the signal charge quantity accumulated in accumulating region 15 until time t2.

As a result, since contrast detection capability in the high illumination region becomes high, a dynamic range of pixel circuit 100 can be expanded. Especially, by appropriately setting reference light quantity Lr, the sensitivity characteristics of the light receiving sensitivity characteristics in a specified low illumination region (<Lr) are secured similarly to the conventional one, while the dynamic range in the high illumination region can be expanded. In addition, as can be understood from the above description, the dynamic range attained by pixel circuit 100 varies depending on extended time Td. In other words, according to the control of the pixel circuit in this embodiment, required extended time Td can be uniquely designed based on the desired dynamic range.

Especially, according to the pixel control in the first embodiment, the dynamic range can be expanded only by controlling whether or not the on period of transfer gate 21 (operation period of transfer circuit 20) is extended, without adding an especial component in the pixel circuit. Therefore, concerning the solid-state image pickup element including pixel circuit 100 and pixel control circuit 200 according to this embodiment, the pixel circuit can be miniaturized, while the dynamic range can be expanded without complicating the pixel control (control of the pixel circuit) or arithmetic processing in a subsequent stage of the pixel circuit. As a result, the solid-state image pickup element can be produced at low cost, while miniaturization so as to be mounted in a mobile device and an expanded dynamic range can be realized.

[Variation of First Embodiment]

While the description has been made of the single pixel circuit and its control in the first embodiment, the present invention focuses on application to a solid-state image pickup element in which plurality of pixel circuits 100 are arranged in an array, in practice. In addition, since the components such as timer circuit 220 and pixel control circuit 230 exist in the pixel control circuit 200 (FIG. 1), a certain degree of circuit area is needed. Therefore, in a variation of the first embodiment, a description will be made of an effective configuration example of the solid-state image pickup element using pixel circuits 100 and pixel control circuit 200 according to the first embodiment.

Figure 6:
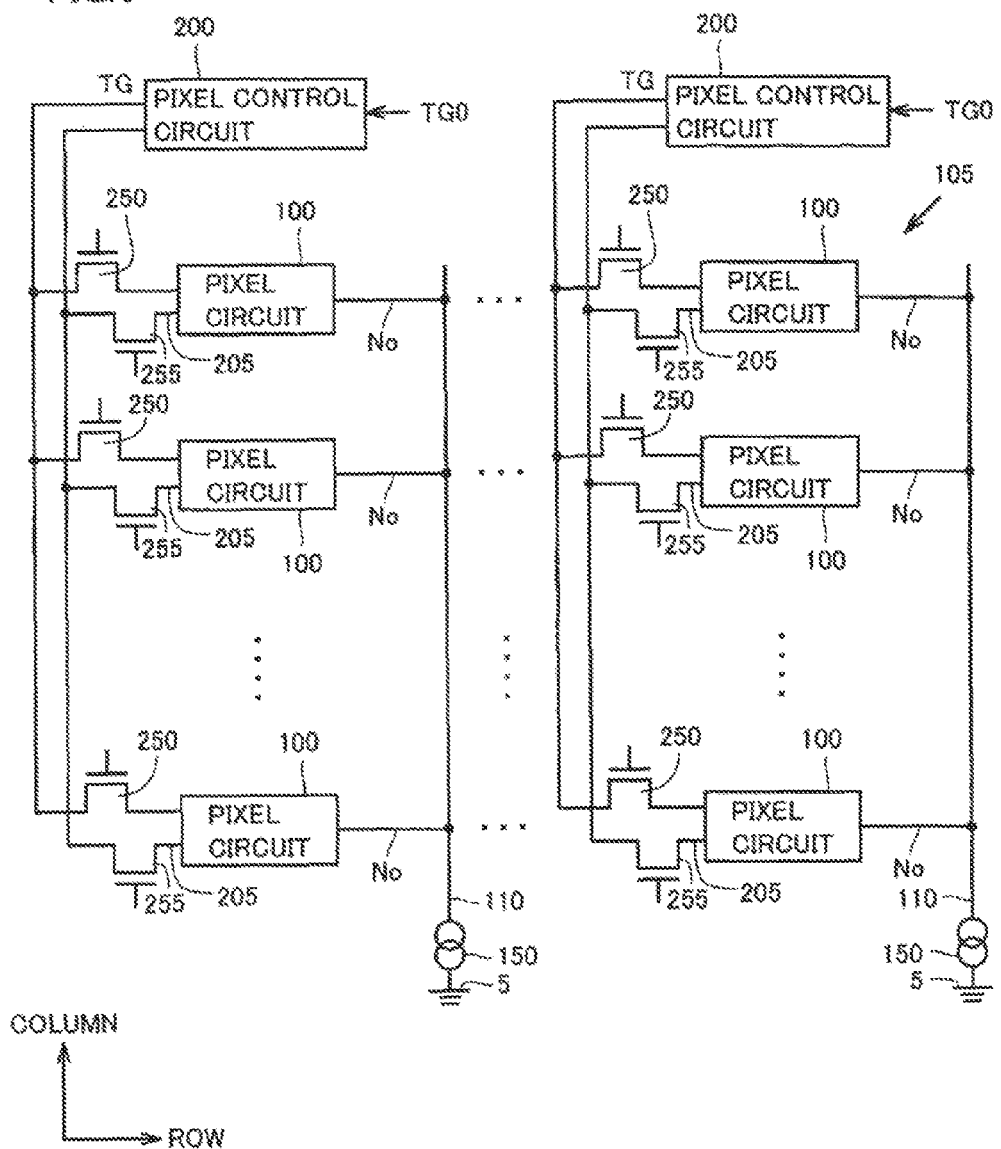
FIG. 6 is a conceptual view showing an array configuration of a solid-state image pickup element according to a variation of the first embodiment of the present invention.

Referring to FIG. 6, the solid-state image pickup element according to the variation of the first embodiment of the present invention is configured by a pixel array 105 in which pixel circuits 100 shown in FIG. 1 are arranged in a matrix. In the pixel array, pixel rows can be sequentially selected by vertical scanning, and pixel columns can be sequentially selected by horizontal scanning. En addition, basically, a description will be made assuming that the pixel control according to the first embodiment is applied to all pixel circuits 100 in pixel array 105, while the pixel control according to the first embodiment can be applied only to certain pixels of the pixels in pixel array 105.

For example, when one row of the pixel rows is selected as a scan target by the vertical scanning, output potential Vout is outputted from the pixel circuit on the scan row to a data line 110 provided with respect to each pixel column. As described above, the connection between each pixel circuit 100 and data line 110 can be controlled by pixel selector switch 50 (FIG. 1).

Pixel control circuit 200 (FIG. 1) is arranged with respect to each pixel column. Thus, selector switches 250 and 255 are arranged between pixel control circuit 200 and pixel circuit 100 in each pixel column. Selector switch 250 is interposed so as to connect pixel control circuit 200 to transfer circuit 20 of corresponding pixel circuit 100. In addition, selector switch 255 is interposed so as to connect pixel control circuit 200 to feed-back path 205 of corresponding pixel circuit 100.

Since pixel circuits 100 are sequentially controlled according to the vertical scanning and/or the horizontal scanning in the solid-state image pickup element, one pixel circuit of the pixel circuits in the same column can be selectively connected to pixel control circuit 200 by turning on/off selector switches 250 and 255 in each pixel column. Thus, pixel circuits 100 belonging to the same pixel column can share one pixel control circuit 200. That is, the pixel control according to the first embodiment can be applied to each pixel circuit 100 according to the sequence shown in FIG. 3.

In this configuration, since the number of pixel control circuits 200 is reduced, the circuit area can be reduced, and since pixel control circuit 200 is arranged outside the pixel array, an area of the pixel array can be reduced. As a result, the small-sized image pickup element suitable for being mounted in the mobile device can be more easily provided.

In addition, while one pixel control circuit 200 is arranged with respect to each pixel column, and common pixel control circuit 200 is shared by pixel circuits 100 in the same pixel column in the variation of the first embodiment, pixel control circuit 200 can be shared in another configuration. For example, common pixel control circuit 200 may be arranged with respect to each group other than the pixel column, and selector switches 250 and 255 may be appropriately arranged between pixel circuits 100 and pixel control circuit 200 belonging to that group. Alternatively, the pixel column may be further divided into several groups, and common pixel control circuit 200 may be arranged with respect to each group. That is, it is to be noted that the group of pixel circuits 100 sharing pixel control circuit 200 can be optionally set.

[Second Embodiment]

According to a second embodiment, based on the configuration of the first embodiment in which potential V (FD) of floating diffusion region 30 is directly fed back, a description will be made of a configuration to control the on period of transfer gate 21 (operation period of transfer circuit 20), according to feedback of an electric signal provided after FD potential V (FD) is amplified.

Figure 7:
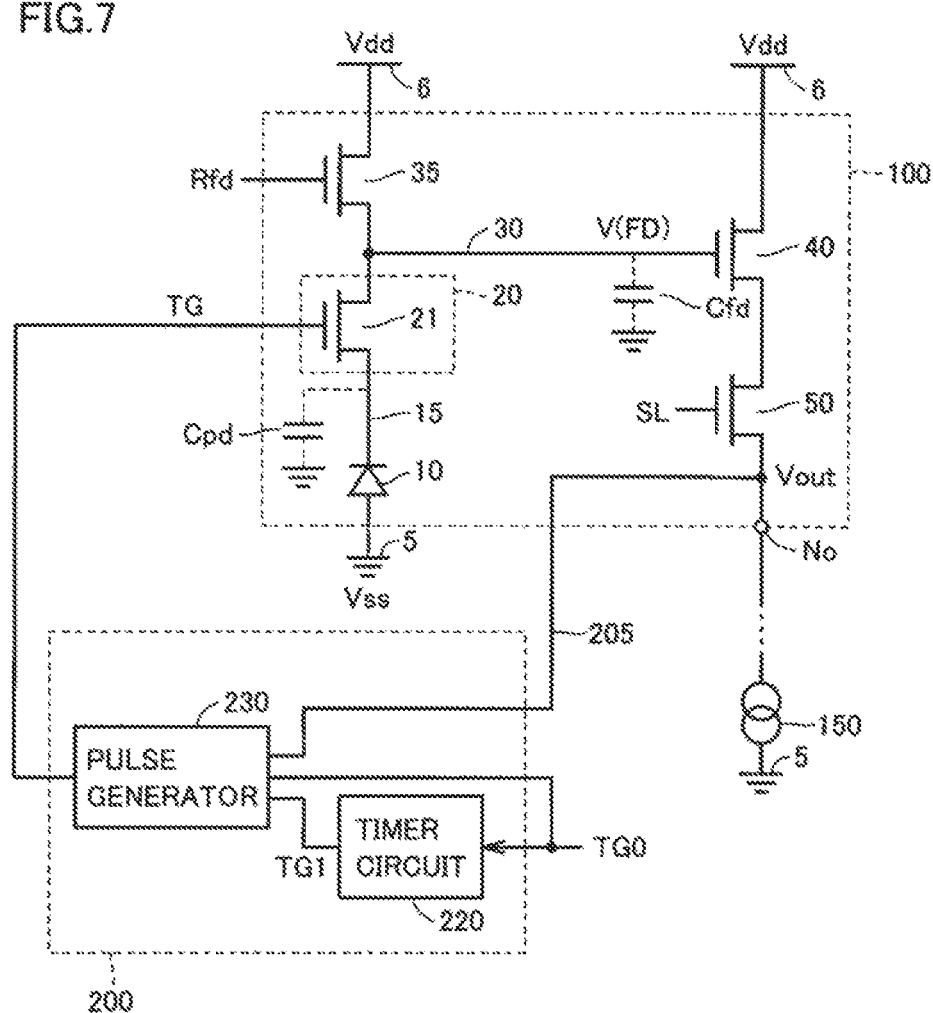
FIG. 7 is a circuit diagram showing configurations of a pixel circuit and a pixel control circuit according to a second embodiment of the present invention.

FIG. 7 is a circuit diagram showing configurations of a pixel circuit and a pixel control circuit according to the second embodiment of the present invention.

Referring to FIG. 7, compared with FIG. 1, output node No of pixel circuit 100 is connected to pixel control circuit 200 through feed-back path 205 in the second embodiment. As described in the first embodiment, during the on period of pixel selector switch 50, output potential Vout corresponding to potential V (FD) of floating diffusion region 30 is generated at output node No by transistor 40 serving as the source follower amplifier. Thus, output potential Vout is transmitted to pixel control circuit 200 through feed-back path 205.

Since output potential Vout is provided after the amplification by transistor 40, inverting amplifier circuit 210 is not necessarily provided. That is, by arranging an inverter in pulse generator 230, the signal showing the compared result between FD potential V (FD) and the reference potential can be generated based on output potential Vout. In addition, output potential Vout can be fed back similarly when feed-back path 205 is provided in a connection point between transistor 40 and pixel selector switch 50. Since other circuit configurations shown in FIG. 7 are the same as those in FIG. 1, their detailed descriptions are not repeated.

Figure 8:
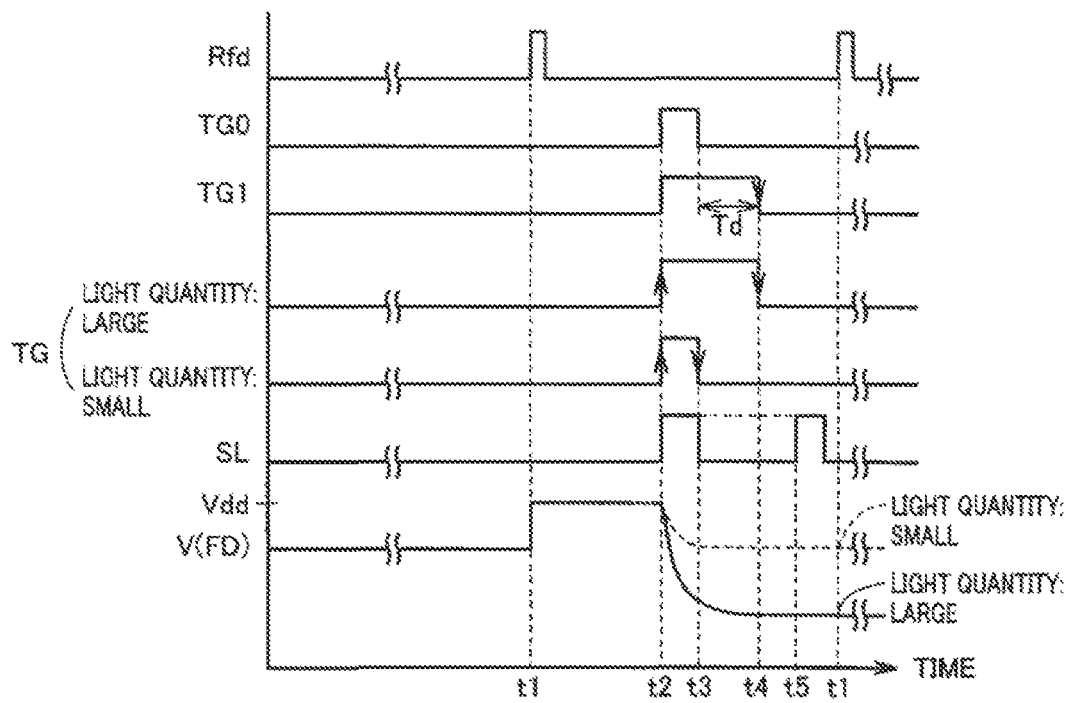
FIG. 8 is a waveform diagram to describe control operations of the pixel circuit and the pixel control circuit according to the second embodiment of the present invention.

FIG. 8 is an operational waveform diagram to describe a control operation of the pixel circuit according to the second embodiment shown in FIG. 7.

Referring to FIG. 8, compared with FIG. 3, in the pixel control according to the second embodiment, it is also necessary to provide a period during which output potential Vout is generated by turning on pixel selector switch 50 so that output node No is driven by current source 150, in a certain period before time t3. Thus, similar to the first embodiment, the comparison between FD potential V (FD) and the reference potential at time t3 (corresponding to the comparison between the light receiving quantity and reference light quantity Lr in FIG. 5) can be equivalently carried out.

In the example in FIG. 8, pixel selector switch 50 is kept on by setting pixel selection signal SL to H level during the same period (t2 to t3) as that of transfer control reference signal TG0. Thus, transfer control reference signal TG0 can be generated by the feedback of output potential Vout similarly to FIG. 3.

In addition, under the pixel control, it is essentially necessary to provide the on period of pixel selector switch 50 at the time of the feedback of output potential Vout at time t3, and the readout of output potential Vout from pixel circuit 100 at time t5. However, as described in FIG. 3, the on period of pixel selector switch 50 can be optionally set as long as it includes the above periods. For example, pixel selection signal SL may be generated so that the on state of pixel selector switch 50 can be maintained from before time t2 until just before the next reset timing (time t1).

Since other operations of the pixel control are the same as those in the first embodiment (FIG. 3), their detailed descriptions are not repeated.

Therefore, pixel circuit 100 and pixel control circuit 200 according to the second embodiment (FIG. 7) can realize the same pixel control as that of the first embodiment by feeding back output potential Vout instead of FD potential V (FD). That is, under the pixel control, the pixel circuit is miniaturized, while the light receiving sensitivity characteristics are maintained in the low illumination region, and the dynamic range is expanded in the high illumination region.

Especially, according to the configuration in the second embodiment, since floating diffusion region 30 can be prevented from being connected to the outside of pixel circuit 100, capacitance Cfd of floating diffusion region 30 is not affected by the formation of feed-back path 205. Therefore, FD capacitance (Cfd) of pixel circuit 100 is prevented from varying among pixels, and the characteristics of pixel circuit 100 can be prevented from varying.

[Variation of Second Embodiment]

Figure 9:
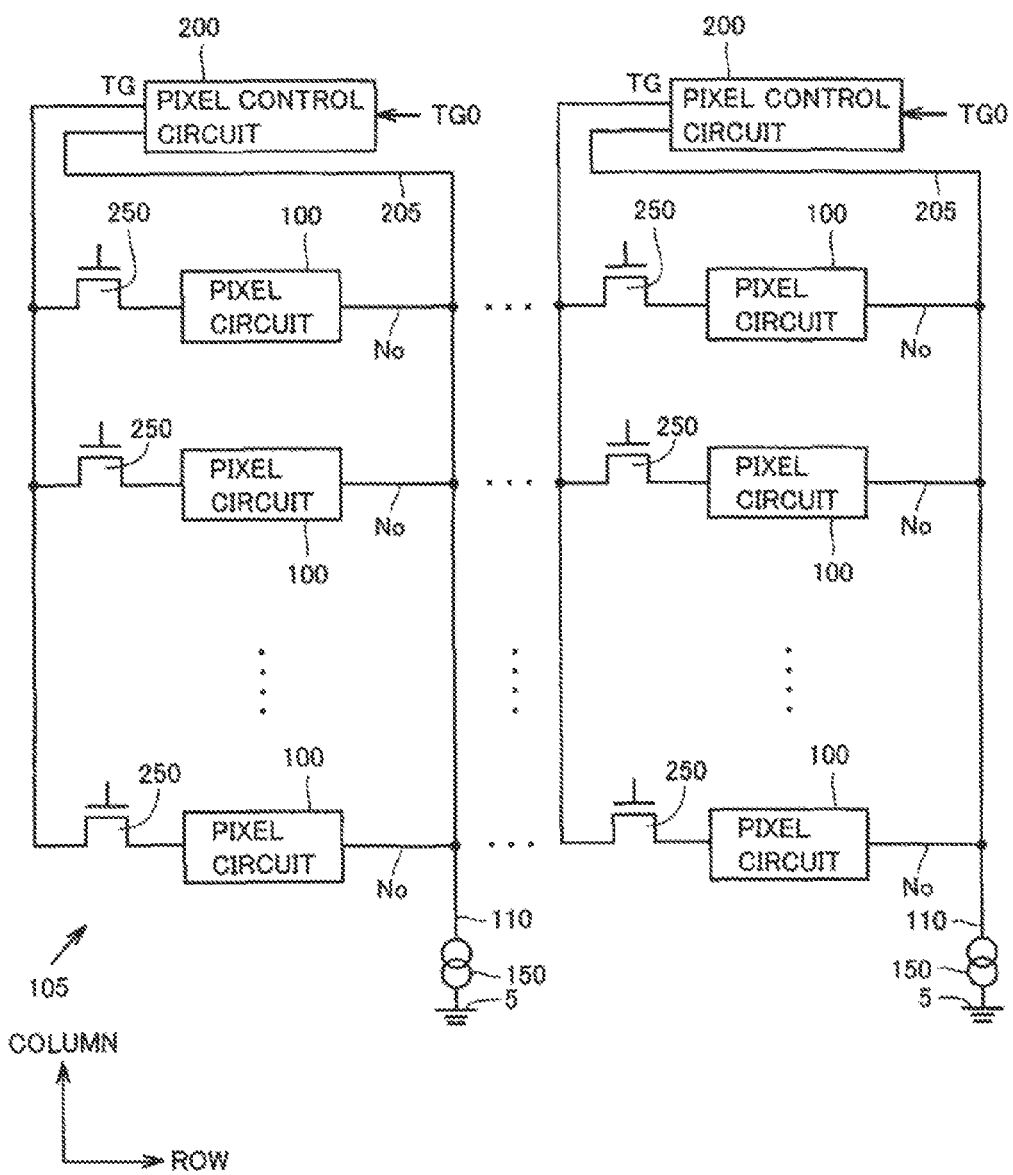
FIG. 9 is a conceptual diagram showing a configuration example of a solid-state image pickup element in which the pixel circuit and pixel control circuit according to the second embodiment of the present invention are arranged in an array.

FIG. 9 is a conceptual diagram showing a configuration example of a solid-state image pickup element in which the pixel circuit and the pixel control circuit according to the second embodiment are arranged in an array.

Referring to FIG. 9, similar to the variation of the first embodiment shown in FIG. 6, pixel circuits 100 shown in FIG. 7 are arranged in a matrix to form pixel array 105, and pixel control circuit 200 (FIG. 7) is arranged with respect to each pixel column. In addition, similar to the variation of the first embodiment, basically, a description will be made assuming that the pixel control according to the first embodiment is applied to all pixel circuits 100 in pixel array, while the pixel control according to the first embodiment can be only applied to certain pixels of the pixels in pixel array.

According to the pixel control in the second embodiment, it is necessary to feed back output potential Vout to pixel control circuit 200, and output potential Vow is outputted to data line 110 by turning on pixel selector switch 50 (FIG. 7) in pixel circuit 100. Therefore, according to the variation of the second embodiment, by connecting data line 110 to pixel control circuit 200 in each pixel column, feed-back path 205 can be selectively formed between pixel control circuit 200 and pixel circuit 100 on the scan row without providing selector switch 255 in each pixel circuit 100 as shown in FIG. 6.

Meanwhile, selector switch 250 is arranged between pixel control circuit 200 and each pixel circuit 100 similarly to FIG. 6. Thus, by turning on/off selector switch 250 at an appropriate timing in each pixel column, one pixel circuit among pixel circuits 100 in the same column can be selectively connected to pixel control circuit 200. While pixel control circuit 200 is shared by pixel circuits 100 belonging to the same pixel column, the pixel control according to the second embodiment can be applied to each pixel circuit 100 according to the sequence shown in FIG. 8.

As described above, as for pixel circuit 100 and pixel control circuit 200 according to the second embodiment also, similar to the first embodiment, the small-sized image pickup element suitable for being mounted in the mobile device can be further easily constituted by arranging pixel circuits 100 in the array and arranging pixel control circuit 200 shared in each pixel column, outside the array. Especially, according to the variation of the second embodiment, the number of the switch elements arranged between pixel control circuit 200 and pixel circuits 100 can be reduced as compared with the variation of the first embodiment, so that the solid-state image pickup element can be further miniaturized.

In addition, while one pixel control circuit 200 is arranged in each pixel column, and common pixel control circuit 200 is shared by pixel circuits 100 in the same pixel column in the variation of the second embodiment also, as described in the variation of the first embodiment, pixel control circuit 200 can be shared in another configuration. That is, a group of pixel circuits 100 sharing pixel control circuit 200 can be optionally set.

[Third Embodiment]

According to a third embodiment, a description will be made of another variation of the pixel circuit configuration.

Figure 10:
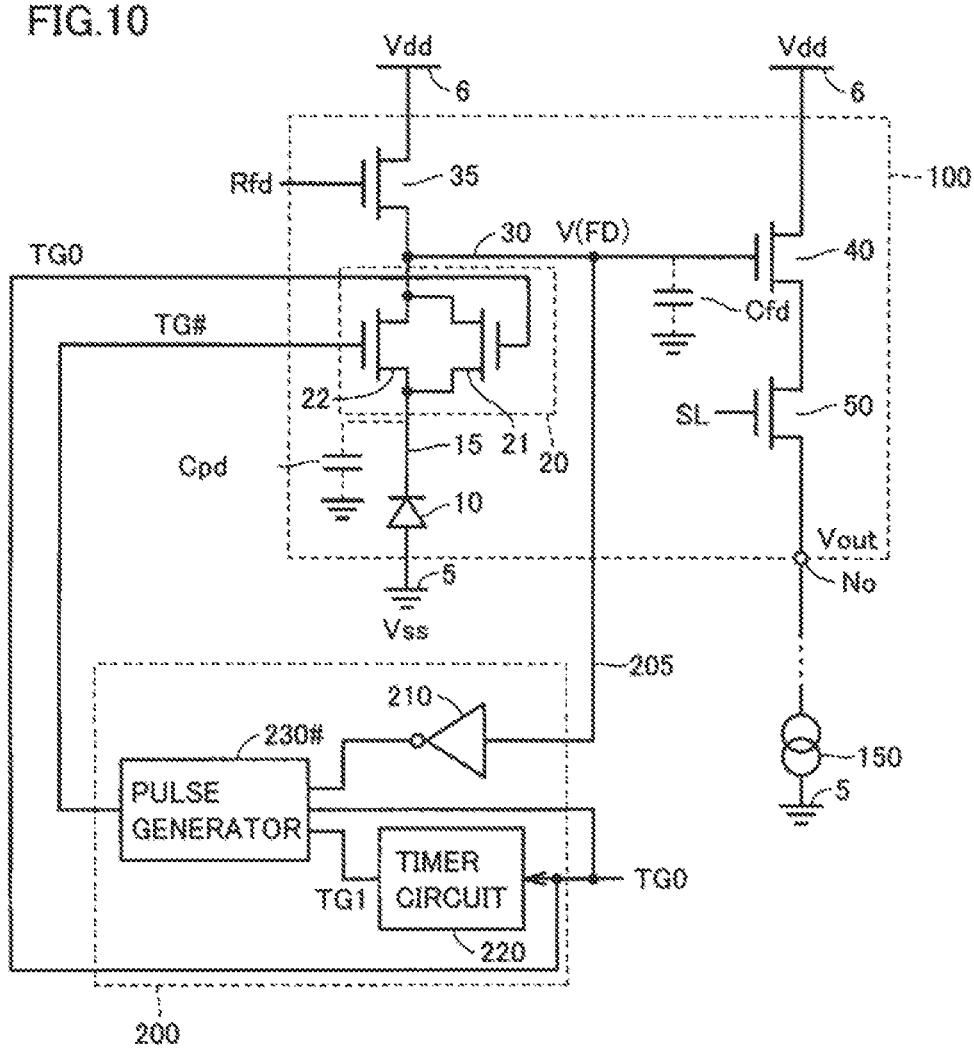
FIG. 10 is a circuit diagram showing configurations of a pixel circuit and a pixel control circuit according to a third embodiment of the present invention.

Referring to FIG. 10, pixel circuit 100 according to the third embodiment differs from pixel circuit 100 shown in FIG. 1 in a configuration of transfer circuit 20. More specifically, according to the third embodiment, transfer circuit 20 includes transfer gate 21 and an auxiliary transfer gate 22 connected in parallel between accumulating region 15 and floating diffusion region 30. Since other circuit configurations of pixel circuit 100 are the same as those in FIG. 1, their detailed descriptions are not repeated.

Similar to the first embodiment, pixel control circuit 200 generates a transfer control signal TG# to turn on/off auxiliary transfer gate 22, in response to FD potential V (FD) from feed-back path 205 provided in floating diffusion region 30 and transfer control reference signal TG0. Meanwhile, transfer control reference signal TG0 is directly supplied to the gate of transfer gate 21.

Figure 11:
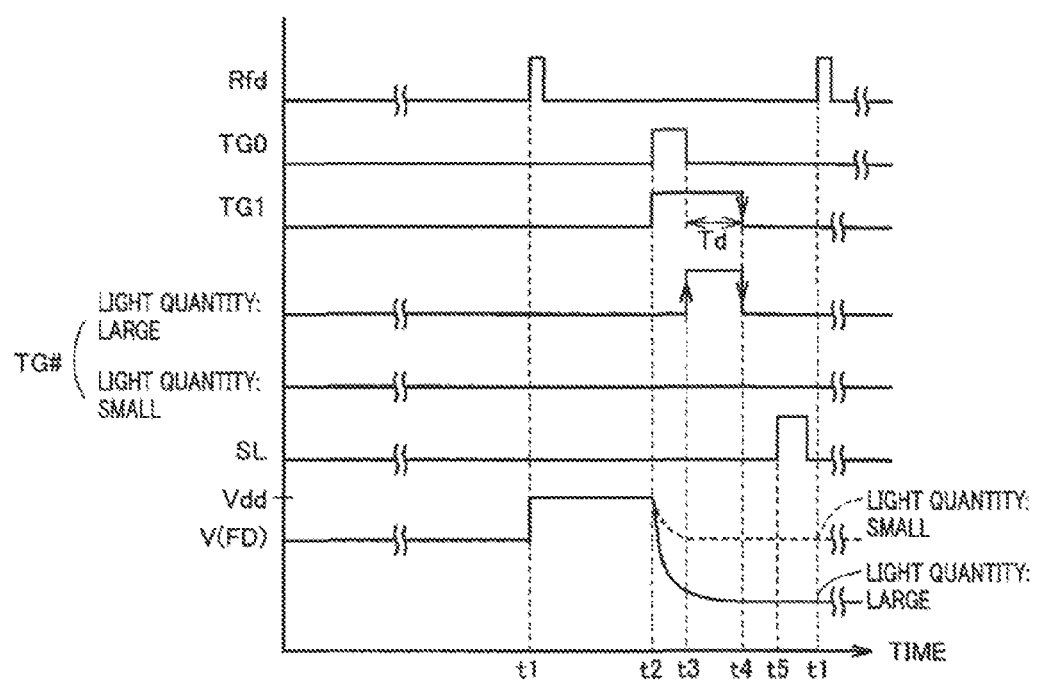
FIG. 11 is a waveform diagram to describe control operations of the pixel circuit and the pixel control circuit according to the third embodiment.

Referring to FIG. 11, transfer control signal TG# is set so as to keep on auxiliary transfer gate 22 during the period of times t3 to t4 when the light receiving quantity of pixel circuit 100 is large, while being set so as to keep off auxiliary transfer gate 22 when the light receiving quantity of pixel circuit 100 is small, based on transfer control reference signal TG0, control signal TG1 of timer circuit 220 (extended time Td), and the compared result between FD potential V (FD) and the reference potential (such as output signal of inverting amplifier circuit 210).

By turning on/off transfer gate 21 and auxiliary transfer gate 22 in response to transfer control reference signal TG0 and transfer control signal TG#, respectively, transfer circuit 20 can be operated similar to the first embodiment.

That is, signal charges accumulated in accumulating region 15 so far can be transferred to floating diffusion region 30 when transfer circuit 20 is operated by keeping on transfer gate 21 for times t2 to t3. In addition, for times t3 to t4, auxiliary transfer gate 22 is turned on/off based on FD potential V (FD), and transfer circuit 20 is operated when the light receiving quantity is large while transfer circuit 20 is not operated when the light receiving quantity is small. As a result, the charge transferring operation from accumulating region 15 to floating diffusion region 30 is performed by transfer circuit 20 similarly to the first embodiment. In addition, pixel selection signal SL is also generated similarly as described in the first embodiment (FIG. 3).

Therefore, with the pixel circuit and pixel control circuit according to the above third embodiment also, a dynamic range can be expanded without complicating the pixel control (control of the pixel circuit) or arithmetic processing in the subsequent step of the pixel circuit, while an additional circuit component of the pixel circuit is suppressed to a minimum, similar to the first embodiment.

In addition, as for pixel circuit 100 and pixel control circuit 200 according to the third embodiment shown in FIG. 10, similar to the variation of the first embodiment shown in FIG. 6, a small-sized image pickup element suitable for being mounted in the mobile device can be further easily constituted by arranging pixel circuits 100 in the array and arranging pixel control circuit 200 shared in each pixel column (certain group), outside the array.

However, it is to be noted that in the pixel control according to the third embodiment, it is necessary to control the transfer from pixel control circuit 200 to each pixel circuit 100 with respect to each of transfer control reference signal TG0 and transfer control signal TG#. Therefore, selector switch 250 shown in FIG. 6 has to be arranged independently so as to correspond to each of transfer gate 21 and auxiliary transfer gate 22 in each pixel control circuit 100.

[Variation of Third Embodiment]

Figure 12:
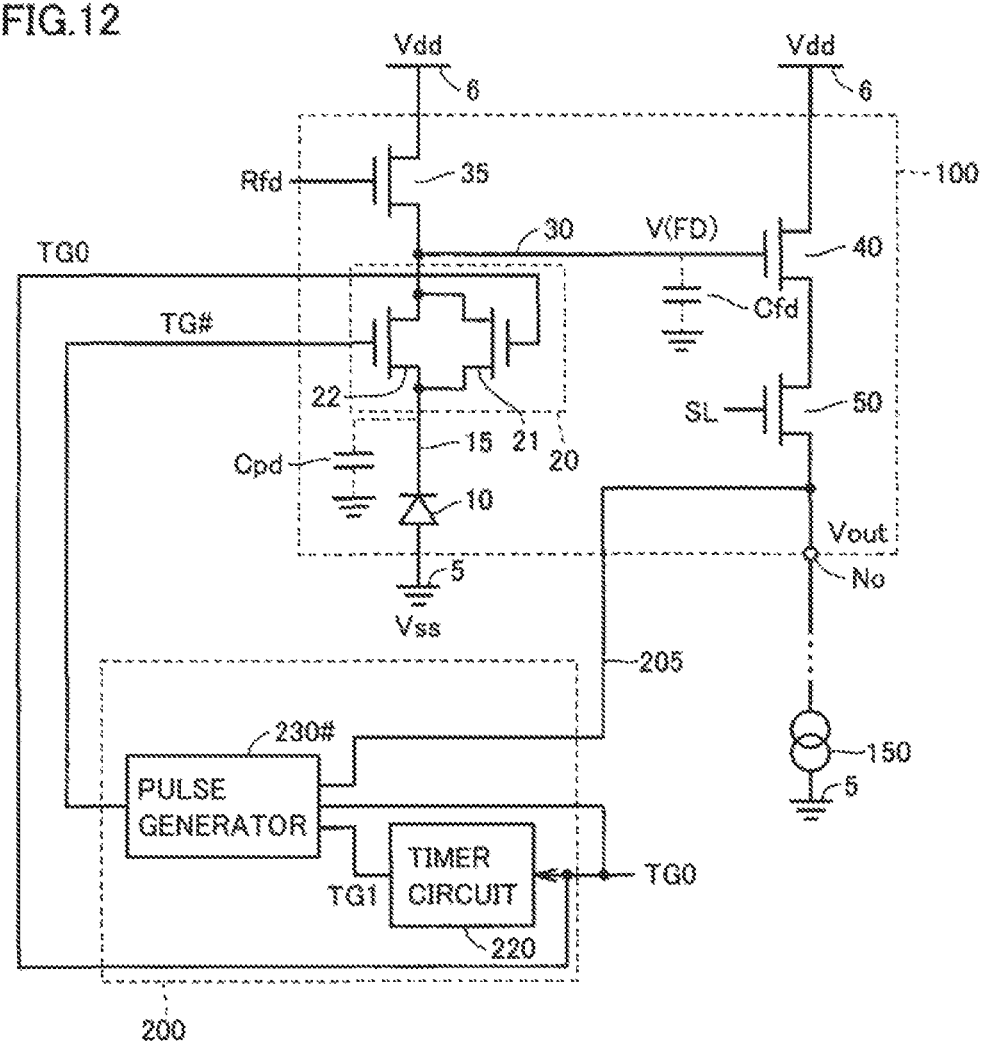
FIG. 12 is a circuit diagram showing configurations of a pixel circuit and a pixel control circuit according to a variation of the third embodiment of the present invention.

FIG. 12 is a circuit diagram showing configurations of a pixel Circuit and a pixel control circuit according to a variation of the third embodiment.

Referring to FIG. 12, compared with FIG. 10, in the variation of the third embodiment, feed-back path 205 is provided between output node No of pixel circuit 100 having the same configuration as the third embodiment, and pixel control circuit 200, similar to the second embodiment.

Pixel control circuit 200 generates transfer control reference signal TG0 and transfer control signal TG# similar to the third embodiment (FIG. 10) except that comparison between FD potential V (FD) and the reference potential to determine whether or not the light receiving quantity of pixel circuit 100 is larger than the reference quantity is carried out by using output potential Vout provided after FD potential is amplified, instead of directly using FD potential V (FD). In addition, in the configuration in FIG. 12 also, feed-back path 205 can be provided in a connection point between transistor 40 and pixel selector switch 50. Since other configurations are same as those of the third embodiment, their detailed descriptions are not repeated.

In this configuration, the pixel control can be performed by using output potential Vout provided after amplification by transistor 40 serving as the amplifier (source follower amplifier) similar to the second embodiment, in pixel circuit 100 provided with transfer circuit 20 including transfer gate 21 and auxiliary transfer gate 22 connected in parallel, similar to the third embodiment.

As a result, a solid-state image pickup element including pixel circuit 100 and pixel control circuit 200 according to the variation of the third embodiment can also produce the same effect as that of the second embodiment.

In addition, as for pixel circuit 100 and pixel control circuit 200 according to the variation of the third embodiment shown in FIG. 12, similar to the variation of the second embodiment shown in FIG. 9, the small-sized image pickup element suitable for being mounted in the mobile device can be further easily provided by arranging pixel circuits 100 in the array and arranging pixel control circuit 200 shared in each pixel column (certain group), outside the array.

However, similar to the third embodiment, since it is necessary to control the transfer from pixel control circuit 200 to each pixel circuit 100 with respect to each of transfer control reference signal TG0 and transfer control signal TG#, selector switch 250 shown in FIG. 9 has to be arranged independently so as to correspond to each of transfer gate 21 and auxiliary transfer gate 22 in each pixel control circuit 100.

[Fourth Embodiment]

Figure 13:
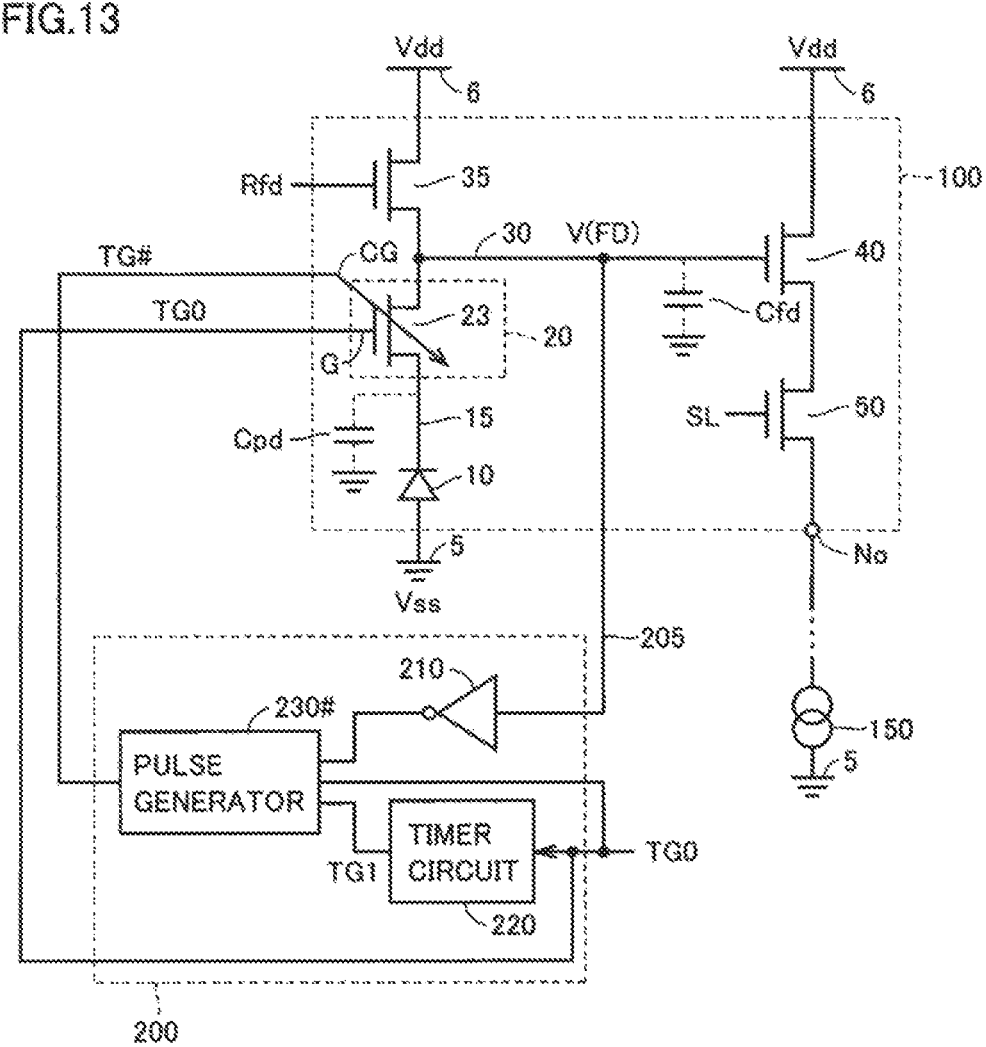
FIG. 13 is a circuit diagram showing configurations of a pixel circuit and a pixel control circuit according to a fourth embodiment of the present invention.

FIG. 13 is a circuit diagram showing configurations of pixel circuit 100 and pixel control circuit 200 according to a fourth embodiment.

Referring to FIG. 13, compared with FIG. 1, pixel circuit 100 according to the fourth embodiment differs in that transfer circuit 20 is composed of a dual gate transistor 23. Since other configurations of pixel circuit 100 are the same as those in the first embodiment (FIG. 1), their detailed descriptions are not repeated.

Thus, pixel control circuit 200 is formed similarly to the third embodiment (in FIG. 10), and transfer control reference signal TG0 and transfer control signal TG# shown in FIG. 11 are applied to transfer circuit 20.

Dual gate transistor 23 has a conventional gate G and a control gate CG, and controls execution/stop of the charge transfer from accumulating region 15 to floating diffusion region 30, based on potentials of conventional gate G and control gate CG. More specifically, n-type dual gate transistor 23 is conducted when at least one of normal gate G and control gate CG is set at on potential (H level in the n-type transistor: Vdd), and transfers the signal charges from accumulating region 15 to floating diffusion region 30. Meanwhile, when both of normal gate G and control gate CG are not set at on potential, the transfer of the signal charges from accumulating region 15 to floating diffusion region 30 is stopped.

For example, dual gate transistor 23 may include a semiconductor element capable of adjusting a gain coefficient 13, and configured to control a gain coefficient of the transistor by modulating an electric field formed in a channel, based on a potential of control gate CG produced so as to overlap conventional gate G, as disclosed in International Publication No. WO02/059979 (or Japanese Patent Laying-Open No. 2002-222944). and Japanese Patent Laying-Open No. 2005-012002.

In the case of transfer circuit 20 configured as shown in FIG. 13 also, the signal charges can be transferred from accumulating region 15 to floating diffusion region 30 by keeping on dual gate transistor 23, during both H level period of transfer control reference signal TG0 and H level period of transfer control signal TG# shown in FIG. 10. That is, transfer circuit 20 can be operated similar to the first embodiment.

As a result, in the case of pixel circuit 100 and pixel control circuit 200 according to the above fourth embodiment also, similar to the first embodiment, a dynamic range can be expanded without complicating the pixel control (control of the pixel circuit) or arithmetic processing in the subsequent step of the pixel circuit, while the pixel circuit can be miniaturized.

In addition, as for pixel circuit 100 and pixel control circuit 200 according to the fourth embodiment shown in FIG. 13, similar to the variation of the first embodiment shown in FIG. 6, the small-sized image pickup element suitable for being mounted in the mobile device can be further easily constituted by arranging pixel circuits 100 in the array and arranging pixel control circuit 200 shared in each pixel column (certain group), outside the array.

However, it is to be noted that according to the pixel control in the fourth embodiment, it is necessary to control the transfer from pixel control circuit 200 to each pixel circuit 100 with respect to each of transfer control reference signal TG0 and transfer control signal TG#. Therefore, similar to the third embodiment, selector switch 250 shown in FIG. 6 has to be arranged independently so as to correspond to each of transfer gate 21 and auxiliary transfer gate 22 in each pixel control circuit 100.

[Variation of Fourth Embodiment]

Figure 14:
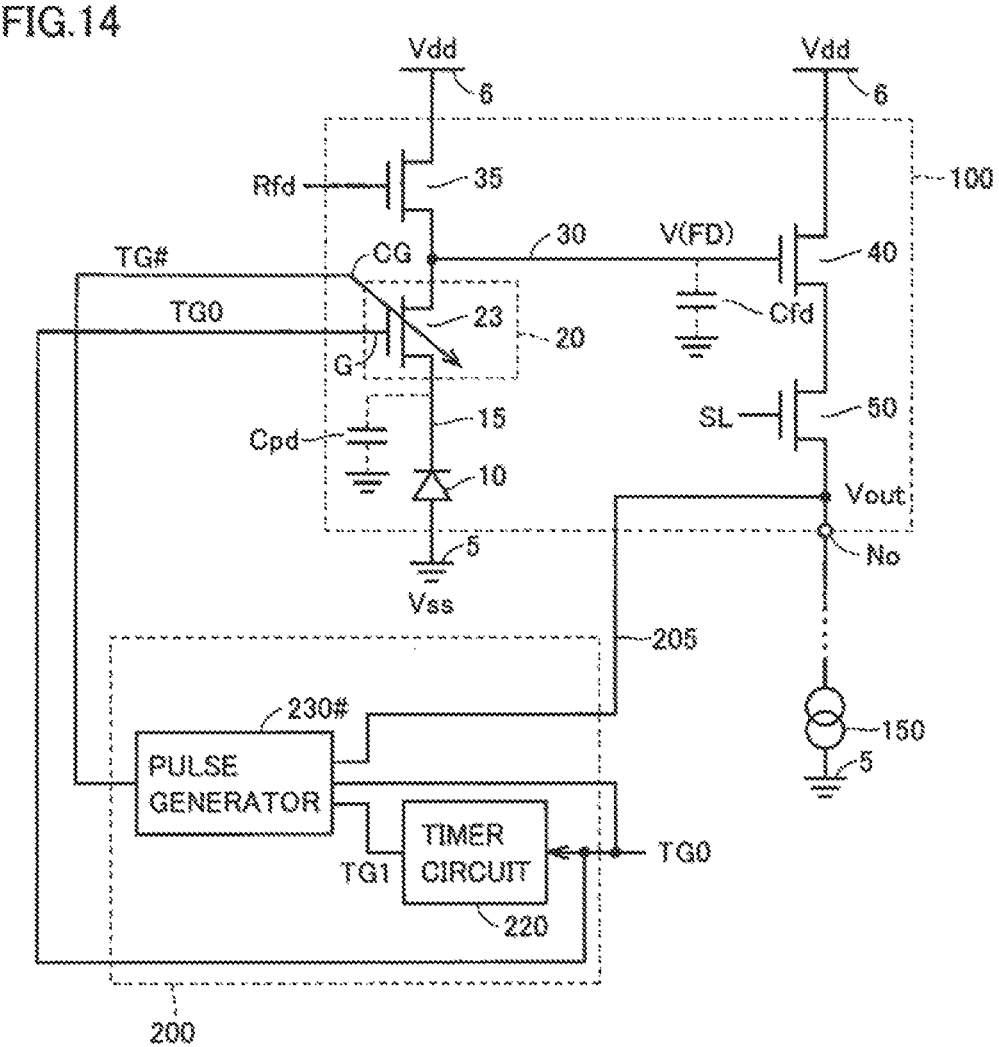
FIG. 14 is a circuit diagram showing configurations of a pixel circuit and a pixel control circuit according to a variation of the fourth embodiment of the present invention.

FIG. 14 is a circuit diagram showing configurations of a pixel circuit and a pixel control circuit according to a variation of the fourth embodiment.

Referring to FIG. 14, compared with FIG. 13, in the variation of the fourth embodiment, feed-back path 205 is provided between output node No of pixel circuit 100 having the same configuration as the third embodiment, and pixel control circuit 200, similar to the second embodiment.

Pixel control circuit 200 uses output potential Vout provided after FD potential is amplified, for comparison between FD potential V (FD) and the reference potential to determine whether or not the light receiving quantity of pixel circuit 100 is larger than the reference value, instead of directly using FD potential V (FD). Thus, transfer control reference signal TG0 and transfer control signal TG# are generated similarly to the fourth embodiment (FIG. 12). In addition, as described in FIG. 7, output potential Vout can be also fed back similarly when feed-back path 205 is provided in a connection point between transistor 40 and pixel selector switch 50. Since other configurations are same as those of the third embodiment, their detailed descriptions are not repeated.

In this configuration, the pixel control can be performed by using output potential Vout provided after amplification by transistor 40 serving as the amplifier (source follower amplifier) similar to the second embodiment, in pixel circuit 100 provided with transfer circuit 20 including dual gate transistor 23 similar to the fourth embodiment.

As a result, the solid-state image pickup element including pixel circuit 100 and pixel control circuit 200 according to the variation of the fourth embodiment can also produce the same effect as that of the second embodiment.

In addition, as for pixel circuit 100 and pixel control circuit 200 according to the variation of the fourth embodiment shown in FIG. 14, similar to the variation of the second embodiment shown in FIG. 9, a small-sized image pickup element suitable for being mounted in the mobile device can be further easily constituted by arranging pixel circuits 100 in the array and arranging pixel control circuit 200 shared in each pixel column (certain group), outside the array.

However, it is also necessary to control the transfer from pixel control circuit 200 to each pixel circuit 100 with respect to each of transfer control reference signal TG0 and transfer control signal TG#, even in the pixel control according to the variation of the fourth embodiment. Therefore, similar to the fourth embodiment, selector switch 250 shown in FIG. 6 has to be arranged independently so as to correspond to each of transfer gate 21 and auxiliary transfer gate 22 in each pixel control circuit 100.

According to the first to fourth embodiments and their variations, while the light receiving quantity of pixel circuit 100 is compared with the reference light quantity, based on the FD potential at the end of the original operation period of transfer circuit 20 (times t2 to t3 in FIG. 3), as another configuration, the light receiving quantity level of pixel circuit 100 may be determined by another way, and whether or not the operation period of transfer circuit 20 is extended may be determined by its determined result.

[Fifth Embodiment]

The descriptions have been made of the configuration to control whether or not the operation period of transfer circuit 20 is extended with respect to each pixel circuit, in the first to fourth embodiments and their variations.

According to a fifth embodiment, a description will be made of a configuration to control, commonly to the pixel circuits, about whether or not the operation periods of transfer circuits 20 are extended, based on a light receiving level in the whole pixel circuits (that is, pixel array 105 shown in FIGS. 6 and 9). That is, the fifth embodiment focuses on the solid-state image pickup element including pixel circuits 100 according to the first to fourth embodiments and their variations as shown in FIGS. 6 and 9.

Figure 15:
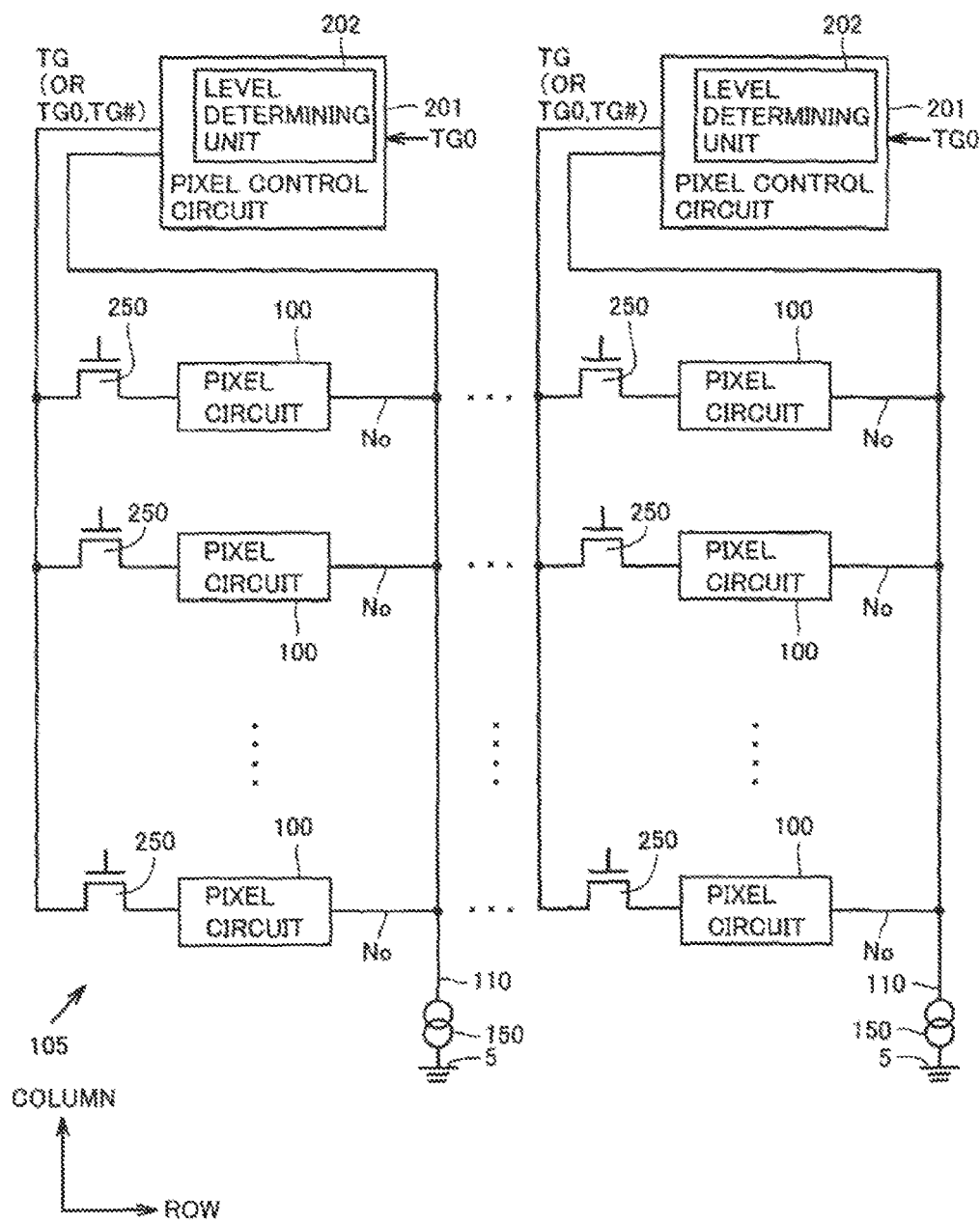
FIG. 15 is a conceptual diagram showing a first example of a solid-state image pickup element according to a fifth embodiment of the present invention.

FIG. 15 is a conceptual diagram showing a first example of the solid-state image pickup element according to the fifth embodiment.

Referring to FIG. 15, the solid-state image pickup element according to the first example of the fifth embodiment differs from the solid-state image pickup element shown in Fig, 6 in that a pixel control circuit 201 is provided instead of pixel control circuit 200. In addition, as for transfer circuit 20 in pixel circuit 100, any one of configurations shown in FIG. 1 (single transfer gate 21), FIG. 10 (transfer gate 21 and auxiliary transfer gate 22), and FIG. 13 (dual gate transistor 23)

may be applied. In addition, although not shown, feed-back path 205 is not needed in each pixel circuit, so that it is eliminated.

Pixel control circuit 201 differs from pixel control circuit 200 in that a level determining unit 202 is provided. Level determining unit 202 determines whether or not the light receiving level of whole pixel circuits 100 is higher than a predetermined level, based on output signals from pixel circuits 100. For example, this determination is made by comparing a total or an average value of the output signals from pixel circuits 100 with a predetermined threshold value.

In addition, while level determining unit 202 is provided in each pixel control circuit 201 in FIG. 15, as a rational configuration, one level determining unit 202 may be shared by whole pixel circuits 100 in pixel array 105 in practice.

Pixel control circuit 201 sends a signal showing a determined result of level determining unit 202 to feed-back path 205 of pixel control circuit 200.

Therefore, in pixel array 105 including pixel circuits 100 having the configuration shown in FIG. 1, when the light receiving level of the whole pixel circuits is not lower than the predetermined level, transfer control signal TG is outputted to pixel circuits 100 based on control signal TG1. Meanwhile, when the light receiving level of the whole pixel circuits is lower than the predetermined level, transfer control signal TG is outputted to pixel circuits 100 based on transfer reference signal TG0.

In addition, in pixel array 105 including pixel circuits 100 having the configuration shown in FIG. 10 or 13, when the light receiving level of the whole pixel circuits is not lower than the predetermined level, transfer control signal TG# is set so as to be kept at H level for a period corresponding to times t3 to t4 shown in FIG. 11 in each pixel circuit 100. Meanwhile, when the light receiving level of the whole pixel circuits is lower than the predetermined level, transfer control signal TG# is fixed to L level in each pixel circuit 100.

Figure 16:
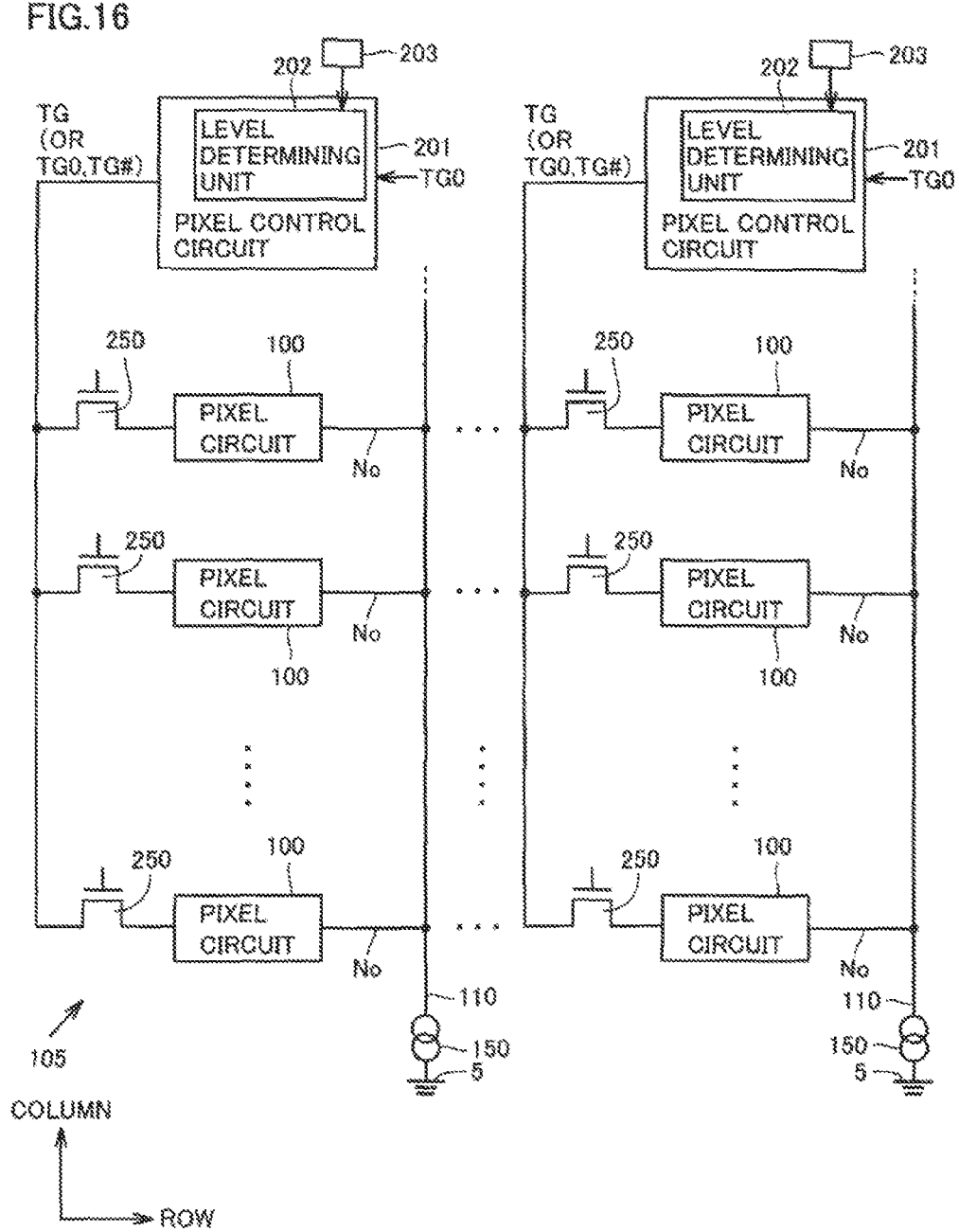
FIG. 16 is a conceptual diagram showing a second example of the solid-state image pickup element according to the fifth embodiment of the present invention.

FIG. 16 is a conceptual diagram showing a second example of the solid-state image pickup element according to the fifth embodiment.

Referring to FIG. 16, a solid-state image pickup element according to the second example of the fifth embodiment differs from the first example shown in FIG. 15 in that an operation switch 203 is further provided.

Operation switch 203 is provided for a user to input an command to select whether or not a dynamic range needs to be expanded. Level determining unit 202 determines whether or not the light receiving level of whole pixel circuits 100 is higher than the predetermined level based on the an input to operation switch.

For example, when operation switch 203 is provided as an input end to be operated when an image is taken at night, level determining unit 202 determines that the light receiving level of the whole pixel circuits is lower than the predetermined level when operation switch 203 is operated, while level determining unit 202 determines that the light receiving level of whole pixel circuits is not lower than the predetermined level when operation switch 203 is not operated. Meanwhile, operation switch 203 may be provided as an input end to be operated when an image is taken in circumstances having high light receiving level.

As for the generation of transfer control signal TG (or TG#) by pixel control circuit 201 based on the determination whether or not the light receiving level is higher than the predetermined level in the whole pixel circuits, its description is not repeated since it is the same as described in FIG. 15.

In addition, while level determining unit 202 and operation switch 203 are provided in each pixel control circuit 201 in FIG. 15, as a rational configuration, level determining unit 202 and operation switch 203 may be shared by whole pixel circuits 100 in pixel array 105 in practice.

As described above, according to the solid-state image pickup element according to the fifth embodiment, the image can be picked up by selecting whether or not the dynamic range is to be increased commonly to the whole pixel circuits, so as to correspond to image pickup scenes having a large difference in light receiving level such as a difference between nighttime image pickup and daytime image pickup in fine weather. Especially, since the feed-back configuration is not necessarily provided in each pixel circuit, the image can be picked up as described above, while the control configuration is simplified.

[Sixth Embodiment]

Descriptions have been made of the configuration to control whether or not the operation period of transfer circuit 20 is increased in the first to fifth embodiments and their variation. According to a sixth embodiment, a description will be made of the fact that the dynamic range can be expanded by setting an operation period length unlike the conventional idea, based on further study about the operation period of transfer circuit 20.

More specifically, according to the sixth embodiment as will be described below, an operation period of transfer circuit 20 is set commonly and fixedly to whole pixel circuits 100 in a solid-state image pickup element.

Figure 17:
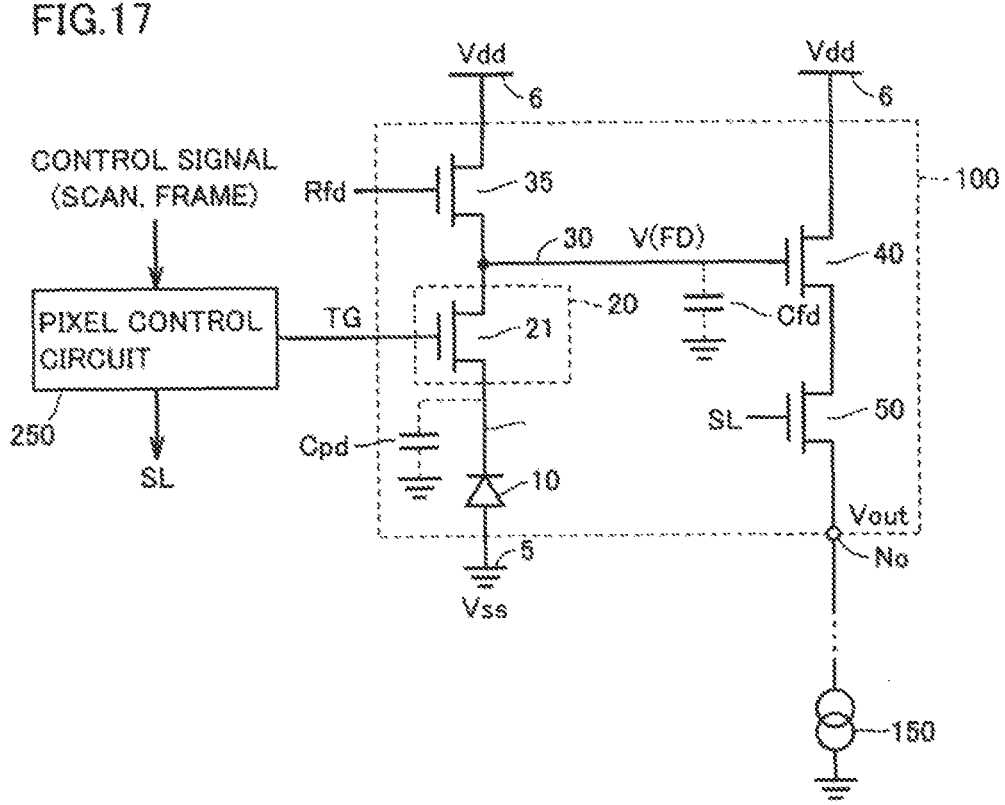
FIG. 17 is a circuit diagram showing configurations of a pixel circuit of a solid-state image pickup element according to a sixth embodiment of the present invention.

FIG. 17 is a circuit diagram showing a configuration of a pixel circuit of the solid-state image pickup element according to the sixth embodiment.

Pixel circuit 100 shown in FIG. 17 differs from pixel circuit 100 shown in FIG. 1 in that feed-back path 205 is eliminated. Pixel circuit 100 itself has a general configuration, and includes photodiode 10 serving as a "light detector element", accumulating region 15, transfer circuit 20, floating diffusion region 30, reset switch 35, transistor 40 serving the " amplifier", and pixel selector switch 50. Pixel control circuit 205 executes control of pixel circuit 100 such as setting of an operation period of transfer circuit 20 with a transfer control signal, and setting of reset timing with reset signal Rfd.

Hereinafter, a description will be made of a usual method for setting the operation period of transfer circuit 20 in pixel circuit 100 with reference to FIGS. 18 and 19.

Figure 18:
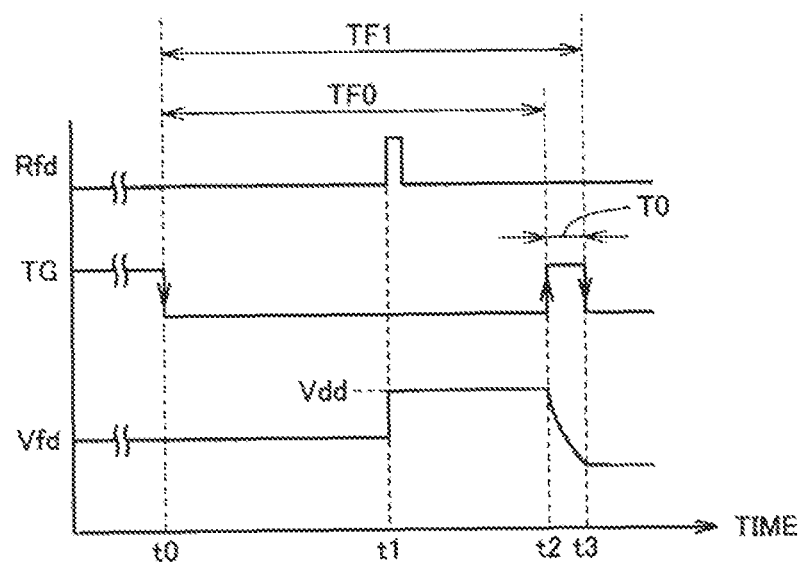
FIG. 18 is a waveform diagram to describe a conventional control operation of the pixel circuit shown in FIG. 17.

Referring to FIG. 18, when the transfer control signal is shifted from H level to L level at time t0, transfer gate 21 is turned off. That is, the operation of transfer circuit 20 is stopped.

As shown in FIG. 19(a), signal charges 90 generated in previous image pickup (previous frame) have been all transferred to floating diffusion region 30 at time t0. Therefore, a signal charge quantity in accumulating region 15 is zero. Meanwhile, at time t0, as shown by dotted lines, signal charges are accumulated by a quantity corresponding to the light receiving quantity in the previous frame in floating diffusion region 30.

Thus, after time t0, photodiode 10 generates signal charges based on received light in new image pickup (present frame) and the signal charges are accumulated in accumulating region 15.

Referring to FIG. 18 again, at time t1, reset signal Rfd is generated. Thus, reset switch 35 (in FIG. 17) is turned on, and FD potential V (FD) is reset to power supply potential Vdd.

As shown in FIG. 19(b), at time t1, there is no signal charge in floating diffusion region 30 after the above reset operation. In addition, while signal charges 90 are accumulated in accumulating region 15 based on the light receiving quantity during the period of times t0 to t1, transfer gate 21 is kept off (transfer circuit 20 is not operated), so that the signal charges in accumulating region 15 is not transferred to floating diffusion region 30. This is because while transfer gate 21 is kept of there is a potential barrier between accumulating region 15 and floating diffusion region 30.

In addition, at certain timing during times t0 to t1, output potential Vout corresponding to FD potential V (FD), that is, an output signal corresponding to the previous frame is read from output node No by turning on pixel selector switch 50.

Referring to FIG. 18 again, during times t2 to t3, transfer control signal TG is set so as to turn on transfer gate 21. That is, transfer control signal TG is equal to transfer control reference signal TG0 in FIG. 3.

As shown in FIG. 19(c), just before time t2, signal charges 90 having a quantity corresponding to the light receiving quantity during the period of time t0 to t2 are accumulated in accumulating region 15. Thus, as shown in FIG. 19(d), as the potential barrier between accumulating region 15 and floating diffusion region 30 is lowered by the operation of transfer circuit 20, signal charges 90 accumulated in accumulating region 15 until time t2 are transferred to floating diffusion region 30.

In addition, during times t2 to t3, photodiode 10 also generates signal charges 90 according to the light received thereby. Signal charges 90 generated in this period are also transferred to floating diffusion region 30 by transfer circuit 20 (transfer gate 21).

Referring to FIG. 18 again, at time t3, transfer control signal TG is set so as to turn off transfer gate 21. Thus, as shown in FIG. 19(e), signal charges 90 generated in the present image pickup (present frame) are all transferred to floating diffusion region 30. After time t3, at certain timing before floating diffusion region 30 is reset, output potential Vout corresponding to FD potential V (FD) is read out from output node No.

Referring to FIG. 18 again, an exposure time corresponding to one image pickup (one frame) is TF1 (TF1=TF0+T0) in each pixel circuit 100. Here, TF0 corresponds to a period from when the time transfer gate 21 is turned off to when transfer gate 21 is turned on again, and T0 corresponds to the on period of transfer gate 21.

Hereinafter, a description will be made of a general setting of the period length (length of T0) between times t2 and t3.

A signal charge quantity generated by photodiode 10 is determined by the product of incident photon-to-current conversion efficiency (quantum efficiency) serving as a physical constant depending on a process and a structure, light receiving strength. and light irradiation time. Meanwhile, an accumulable maximum charge (saturated charge quantity) is determined by capacitance Cpd of accumulating region 15 of photodiode 10. When the signal charges are generated beyond the saturated charge quantity, they cannot be accumulated in accumulating region 15, so that its brightness cannot be detected.

Therefore, a maximum value of the signal charge quantity (hereinafter, referred to as maximum signal charge accumulative quantity) Qpdmax accumulated in accumulating region 15 is determined by the size and structure of photodiode 10. This maximum signal charge accumulative quantity corresponds to a maximum value of the signal charge quantity transferred by transfer gate 21 (transfer circuit 20).

Here, a time required for transfer gate 21 to transfer a certain quantity of signal charges is determined depending on the physical constant depending on the process and the structure, such as a size (W/L) of the transistor of transfer gate 21, and a potential difference between accumulating region 15 and floating diffusion region 30. Therefore, the on period (T0) of transfer gate 21 is preferably set as short as possible to the extent that maximum signal charge accumulative quantity Qpdmax can be transferred by transfer gate 21. In general, T0 is set equally to the time required for transfer gate 21 to transfer maximum signal charge accumulative quantity Qpdmax. Hereinafter T0 is also referred to as a complete transfer period.

According to the configuration and the method for controlling the pixel circuit described in FIGS. 17 and 18, light intensity to generate maximum signal charge accumulative quantity Qpdmax for exposure time TF1 during the one frame period corresponds to an uppermost limit of a contrast-detectable light receiving range. Under the present process and structure, a dynamic range showing the contrast-detectable light receiving range is 60 (dB) in general when a moving image of 30 frames/second is picked up. In addition, complete transfer period T0 at this time is several (ns) to several tens of (ns) in general.

Next, a description will be made of a control operation of the pixel circuit in the solid-state image pickup element according to the sixth embodiment with reference to FIGS. 20 and 21.

As can be understood from a comparison between FIGS. 20 and 18, concerning pixel circuit 100 of the solid-state image pickup element in the sixth embodiment, transfer gate 21 is kept on during times t2 to t4 beyond times t2 to t3. That is, transfer gate 21 is still kept on during an extended period T1 after complete transfer period T0. That is, extended period T1 corresponds to "a first period" in the present invention. In addition, since a control operation until time t2 is the same as that in FIG. 18, its description is not repeated.

Referring to FIG. 21, FIGS. 21(a) to 21(d) are the same as those in the conventional example (in FIG. 19). That is, during the period of times t2 to t3, transfer gate 21 is kept on during complete transfer period T0. In FIG. 21(e), at time t3, it is assumed that maximum signal charge accumulative quantity Qpdmax is transferred to floating diffusion region 30. That is, FIG. 21 shows a case where image pickup corresponds to light receiving intensity beyond the conventional dynamic range. In this case, during times t0 to t2, signal charges 90 is generated beyond maximum signal charge accumulative quantity Qpdmax, but the charge quantity beyond maximum signal charge accumulative quantity Qpdmax cannot be accumulated in accumulating region 15 at the point of time t2 due to the saturation of accumulating region 15.

Capacitance Cfd of floating diffusion region 30 is set in each pixel circuit 100 in a way different from the above conventional idea. That is, Cfd is determined to have room for further receiving the signal charges generated by photodiode 10 in extended period T1 after receiving maximum signal charge accumulative quantity Qpdmax. Therefore, capacitance Cfd of floating diffusion region 30 is larger than capacitance Cpd of accumulating region 15.

Thus, as shown in FIG. 21(f), during times t3 to t4, signal charges 90 generated by photodiode 10 based on the light received after time t3 is additionally transferred to floating diffusion region 30 by keeping transfer gate 21 on during extended period T1. At this time, it is to be noted that when capacitance Cfd of floating diffusion region 30 is designed according to the conventional idea, additionally transferred signal charges 90 cannot be received in floating diffusion region 30.

In addition, when Cfd is ensured to be about twice as large as Cpd, maximum signal charge accumulative quantity Qpdmax can be also received in extended period T1.

Referring to FIG. 20 again, transfer gate 21 is turned off at time t4 after (T0+T1) has been elapsed since time t2. Thus, as shown in FIG. 21(g), after time t4, the potential barrier is again raised by transfer circuit 20, so that the transfer of the signal charges from accumulating region 15 to floating diffusion region 30 is stopped.

Therefore, at the time when transfer gate 21 is turned off, the sum of signal charges 90 accumulated in accumulating region 15 at time 2 and signal charges 90 generated by photodiode 10 during times t2 to t4 is accumulated in floating diffusion region 30.

In addition, at time t4, signal charges 90 generated during extended period T1 are to have been completely transferred to floating diffusion region 30. Because, since exposure starts at t4 for the next frame, an error is generated in detecting a light receiving quantity in the next frame in a case where signal charges 90 are left in accumulating region 15 at that time. Therefore, extended period T1 is preferably set to be the time required for transfer gate 11 to transfer maximum signal charge accumulative quantity Qpdmax in accumulating region 15, that is, a length of complete transfer period T0 or more (T1≥T0).

Referring to FIG. 20 again, after time t4, FD potential V (FD) is kept at a potential provided at time t4. Thus, at certain timing before floating diffusion region 30 is reset next, output potential Vout corresponding to FD potential V (FD) is read from output node No.

That is, concerning pixel circuit 100 of the solid-state image pickup element according to the sixth embodiment, the exposure time corresponding to one pickup (on frame) is extended from TF1 (TF1=TF0+T0, which is referred to as a reference exposure time also) to TF2 (=TF1+T1). A description will be made of a principle of the expansion of dynamic range due to this expansion with reference to FIG. 22.

FIG. 22 is a conceptual diagram to describe output characteristics of the pixel circuit in the solid-state image pickup element according to the sixth embodiment. In addition, a horizontal axis of FIG. 22 shows a light quantity (or-light receiving intensity), and a vertical axis thereof shows a potential change $\Delta V$ (FD) of FD potential V (FD) after being reset. That is, $\Delta V$ (FD) is determined by the signal charge quantity transferred to floating diffusion region 30 and Cfd.

In FIG. 22, the output characteristics are shown by a dotted line in the conventional case of the control operation (FIGS. 18 and 19) and Cfd. According to the conventional pixel circuit, L0 corresponding to a light quantity when photodiode 10 generates maximum signal charge accumulative quantity Qpdmax during reference exposure time TF1 corresponds to an uppermost value of the dynamic range. That is, $\Delta V$ (FD) changes from 0 to V max corresponding to a range of a light quantity Lmn (minimum light quantity value) to L0, so that the light quantity (or intensity of light received) is detected. In other words, in the range where the light quantity is larger than L0, that is, the intensity of the light received is higher than the light intensity corresponding to L0, the light quantity cannot be correctly detected because accumulating region 15 is saturated.

Meanwhile, in the case of the solid-state image pickup element according to the sixth embodiment, since Cfd is designed to be larger than the conventional one, $\Delta V$ (FD) remains at V0 (<Vmax) when maximum signal charge accumulative quantity Qpdmax is generated. Thus, when the intensity of the light received is higher than the light intensity corresponding to L0, $\Delta V$ (FD) increases beyond V0 based on the signal charge quantity generated during extended period T1. That is, $\Delta V$ (FD) can be varied in accordance with the light quantity higher than L0.

Thus, the intensity of the light corresponding to light quantity L1 when $\Delta V$ (FD) reaches Vmax with the total signal charge quantity including additional transfer during extended period T1 corresponds to the uppermost dynamic range. That is, in the solid-state image pick up element according to the sixth embodiment, the dynamic range is expanded by $\Delta L$ (L0 to L1) compared with the conventional range.

Consequently, capacitance Cfd of floating diffusion region 30 has to be set to be more than a sum of a capacitance value to receive maximum signal charge accumulative quantity Qpdmax and a capacitance value to receive the signal charge quantity generated during extended period T1 (that is, signal charge quantity corresponding to expanded dynamic range $\Delta DR$).

Characteristic line in a region having the light quantity larger than L0 changes with extended time T1. As a total quantity of the signal charges generated during extended period T1 relative to the identical light quantity decreases, a detectable light quantity range becomes large due to surplus of Cfd. Therefore, as extended period T1 decreases, slope of the characteristic line becomes moderate, while as extended period T1 increases, the slope of the characteristic line becomes steep.

In addition, a ratio between V0 and Vmax with respect to $\Delta V$ (FD) varies depending on Cfd. That is, the detectable light quantity range during extended period T1 also varies depending on Cfd. As described above, Cfd is preferably determined so that maximum signal charge accumulative quantity Qpdmax can be additionally received in floating diffusion region 30 also during extended period T1. For example, when Cfd is set to be about twice as large as Cpd, the light quantity can be detected during extended period T1 in the rage of signal charge quantity 0 to Qpdmax.

Here, reference dynamic range DR corresponding to Lmn to L0 is expressed by the following formula (1).

$$DR = 20 \times \log_{10}(L0/Lmn) \quad (1)$$

In addition, when the light quantity can be detected during extended period T1 in the range of signal charge quantity 0 to Qpdmax, extended dynamic range $\Delta DR$ corresponding to $\Delta L$ is expressed with a ratio of reference exposure time TF1 to extended period T1 by the following formula (2)

$$\Delta DR = 20 \times \log_{10}(TF1/T1) \quad (2)$$

Thus, expanded dynamic range $\Delta DR$ is determined based on extended period T1. In addition, in a case where the signal charge quantity that can be held by Cfd is smaller than 2×Qpdmax, since floating diffusion region 30 could be saturated during extended period T1, a light quantity can be detected only in a range until saturated. Therefore. expanded dynamic range $\Delta DR$ at this time is smaller than the formula (2). Conversely, in this respect also, Cfd is preferably set to be about twice as large as Cpd.

Meanwhile, as shown in FIG. 22, when extended period T1 decreases, $\Delta L$ with respect to the same Cfd is expanded, while the change of $\Delta V$ (FD) with respect to the light quantity decreases, which is disadvantageous in view of detection of the contrast. Therefore, extended period T1 can be appropriately determined by setting expanded dynamic range $\Delta DR$ so as to cover shortfall of reference dynamic range DR with respect to a desired dynamic range.

For example, in the case of the moving image of 30 frames/second, TF1 is about 33 (ms) for one frame period. At this time, reference dynamic range DR is about 60 (dB) in the conventional solid-state image pickup element as descried above. Meanwhile, a human detectable brightness distribution in the same view ranges five to seven digits (dynamic range is 80 to 140 (dB)). Therefore, extended period T1 may be determined so as to fill the difference with expanded dynamic range ΔDR.

For example, since it is necessary that ΔDR=80 (dB) in order to set the dynamic range of solid-state image pickup element to 140 dB, determination can be made such that $T1=TF1/10^4=3.3$ (μs). Similarly, since it is necessary that ΔDR=40 (dB) in order to set the dynamic range of solid-state image pickup element to 100 dB, determination can be made such that $T1=TF1/10^2=330$ (μs). Actually, with a view to realizing contrast detecting capability equal to a human eyesight level, extended period T1 is preferably set to the extent that the dynamic range of the solid-state image pickup element with expanded dynamic range ΔDR added becomes 80 (dB) to 140 (dB).

As can be understood from the characteristic line in FIG. 22, according to the solid-state image pickup element according to the sixth embodiment, an absolute value output (ΔV (FD)) proportional to the light quantity in the range L0 or smaller can be obtained, based on the signal charge quantity accumulated in accumulating region 15 during times t0 to t3 (reference exposure time TF1). Furthermore, the light quantity in the range larger than L0 can be detected with the signal charge quantity additionally generated by the exposure during extended period T1 (times t3 to t4), as a relative value among pixel circuits 100 (that is, contrast component among pixels). This operation corresponds to an operation to compress a signal or a background light component in the human eyesight. That is, reference exposure time TF1 and the extended exposure time (extended period T1) are equal to image pickups performed in different light quantity (intensity of the light) ranges, and when the generated signal charge quantities are simply combined, the image pickup in a wide dynamic range can be equivalently realized by combining the image pickup results.

Thus, according to the solid-state image pickup element according to the sixth embodiment, the dynamic range can be expanded without complicating the configuration of the pixel circuit or the control of the pixel circuit and/or the arithmetic processing in the subsequent stage of the pixel circuit, by determining the on period of transfer gate 21 (operation period of transfer circuit 20) in each pixel circuit, and capacitance Cfd of floating diffusion region 30 by the idea contrary to the conventional idea. That is, the solid-state image pickup element can be produced at low cost, while the miniaturization suitable for being mounted in the mobile device and the expanded dynamic range can be implemented.

Note that, according to the solid-state image pickup element according to the sixth embodiment, the concept of extending the operation period of transfer circuit 20 of pixel circuit 100 during extended period T1 can be applied to the transfer circuit including transfer gate 21 and auxiliary transfer gate 22. However, with a view to simplifying the circuit configuration and the pixel control, transfer circuit 20 including single transfer gate 21 has an advantage.

In addition, the solid-state image pickup element according to the first to fifth embodiments and their variations, extended time Td is also preferably determined in the same manner as that of extended period T1 in the sixth embodiment. In addition, capacitance Cfd of floating diffusion region 30 is also preferably determined in the same manner as that of the sixth embodiment.

In addition, the solid-state image pickup element configured to control whether or not the operation period of transfer circuit 20 is required to be extended as shown in the first to fifth embodiments and their variations has an advantage compared with the solid-state image pickup element configured to extend the operation period of transfer circuit 20 uniquely and definitely as shown in the sixth embodiment, in that the exposure time can be ensured in the image pickup in low luminance (such as night time). Meanwhile, the solid-state image pickup element according to the sixth embodiment has an advantage in that the dynamic range can be considerably expanded with the totally the same pixel circuit configuration and the control circuit configuration as the conventional ones.

Note that, while the transistor in pixel circuit 100 is all the n-type element in the above embodiments, the conductivity type of the transistor may be appropriately changed, so that a p-type element can be used. In this case also, the same pixel control can be implemented by appropriately reversing the logic level (H/L) of the transfer control signal outputted from pixel control circuit 200, and the connection to power supply node 6/around node 5.

In addition, while the signal charge includes the negative charge (electron) in the first to sixth embodiments and their variations, the signal charge may include a positive charge (hole) as another configuration, by electrically connecting a cathode of photodiode 10 to power supply node 6. Here, it is to be noted that since mobility of the positive charge (hole) is smaller than mobility of the negative charge (electron), the solid-state image pickup element including the pixel circuit and the pixel control circuit shown in the first to fourth embodiments and their variations has an advantage in view of high-speed image pickup.

It should be understood that the embodiments and examples disclosed herein are illustrative and nonrestrictive in every respect. The scope of the present invention is defined by the terms of the claims, rather than the description above, and is intended to include any modification within the scope and meaning equivalent to the terms of the claims.

Industrial Applicability

The present invention can be applied to a general solid-state image pickup element having a light detector element in each pixel circuit.

Reference Signs List 5 ground node, 6 power supply node, 10 photodiode, 15 accumulating region, 20 transfer circuit, 21 transfer gate, 22 auxiliary transfer gate, 23 dual gate transistor, 30 floating diffusion region, 35 reset switch, 40 transistor (amplifier), 50 pixel selector switch, 90, 90#, signal charge, 100 pixel circuit, 105 pixel array, 110 data line, 150 current source, 200, 201 pixel control circuit, 202 level determining unit, 203 operation switch 205 feed-back path, 210 inverting amplifier circuit, 212 transistor, 214 transistor, 220 timer circuit, 230 pulse generator, 250 selector switch, 255 selector switch, Cfd capacitance (floating diffusion region), C0 control gate, Cpd capacitance (accumulating region), CG control gate, G conventional gate, Lmn minimum light quantity value, Lr reference light quantity, N1 input node (inverting amplifier circuit), N2 output node (inverting amplifier circuit), No output node (pixel circuit), Rfd reset signal, SL pixel selection signal, T0 complete transfer period, T1 extended period, Td extended period, TG transfer control signal, TG0 complete control reference signal, TG1 control signal, V (FD) FD potential, Vdd power supply potential, Vout output potential, Vss ground potential.

The invention claimed is:
1. A solid-state image pickup element comprising:
a plurality of pixel circuits; and
a control circuit controlling each of said pixel circuits,
 wherein each of said pixel circuits includes:
a light detector element generating a signal charge in response to light reception;

an accumulating region accumulating the signal charges generated by said light detector element;
a reset switch for electrically connecting a power supply node supplying a reset potential to said accumulating region in response to a reset signal;
a floating diffusion region; and
a transfer circuit configured to transfer the signal charges in said accumulating region to said floating diffusion region when being operated, while being configured to stop said transfer when not being operated,
said control circuit is configured to control said transfer circuit of each said pixel circuit so as to operate said transfer circuit during a complete transfer period required for said transfer circuit to transfer a maximum signal charge accumulative quantity in said accumulating region from said accumulating region to said floating diffusion region, and so as to continue to operate said transfer circuit during a first period after said complete transfer period,
said control circuit further controls said reset switch so as to keep an electrically separated condition between said floating diffusion region and said power supply node while said transfer circuit is operated, and
a capacitance value of said floating diffusion region is not less than a sum of a first capacitance value required to receive said maximum signal charge accumulative quantity, and a second capacitance value required to receive said signal charge generated by said light detector element during said first period.

2. The solid-state image pickup element according to claim 1, wherein said first period has a length of said complete transfer period or more.

3. The solid-state image pickup element according to claim 2, wherein the capacitance value of said floating diffusion region is not less than twice as high as a capacitance value of said accumulating region.

4. The solid-state image pickup element according to claim 3, wherein an operation period of said transfer circuit is provided in a predetermined cycle,
a dynamic range of said solid-state image pickup element is expressed by a sum of a reference dynamic range provided according to a quantity of light required for said light detector element to generate a signal charge quantity corresponding to said maximum signal charge accumulative quantity during a reference exposure period which is a sum of a period from an end of a previous operation period of said transfer circuit until a start of a present operation period thereof and said complete transfer period, and an expanded dynamic range varied depending on a length of said first period, and
said extended dynamic range is determined by a logarithm of a ratio of said reference exposure period to said first period.

5. A method for controlling a solid-state image pickup element comprising a plurality of pixel circuits, wherein
each of said pixel circuits includes a light detector element generating a signal charge in response to light reception;
an accumulating region accumulating the signal charges generated by said light detector element;
a floating diffusion region;
a transfer circuit configured to transfer the signal charges in said accumulating region to said floating diffusion region when being operated, while being configured to stop the transfer when not being operated; and
a reset switch for electrically connecting a power supply node supplying a reset potential to said floating diffusion region prior to an operation of said transfer circuit,
said control method comprises the steps of:
accumulating said signal charges generated by said light detector element in said accumulating region while said transfer circuit is not operated;
operating said transfer circuit during a complete transfer period required for said transfer circuit to transfer a maximum signal charge accumulative quantity in said accumulating region from said accumulating region to said floating diffusion region, and
additionally transferring said signal charge generated by said light detector element after said step of operating, to said floating diffusion region by continuing the operation of the transfer circuit during a first period after said complete transfer period,
said reset switch is controlled so as to keep an electrically separated condition between said floating diffusion region and said power supply node while said transfer circuit is operated, and
a capacitance value of said floating diffusion region is not less than a sum of a first capacitance value required to receive said maximum signal charge accumulative quantity, and a second capacitance value required to receive said signal charges generated by said light detector element during said first period.

6. A solid-state image pickup element comprising:
a pixel circuit including a light detector element generating a signal charge in response to light reception, an accumulating region accumulating the signal charges generated by said light detector element, a floating diffusion region and a transfer circuit configured to transfer the signal charges in said accumulating region to said floating diffusion region when being operated, while being configured to stop the transfer when not being operated; and
pixel controlling means for controlling the transfer of said signal charges, wherein
said pixel controlling means controls said transfer circuit based on a light receiving level of said pixel circuit so as to extend an operation period of said transfer circuit in a case where a light receiving quantity is not lower than a predetermined quantity, contrary to a case where said light receiving quantity is lower than the predetermined quantity.

7. The solid-state image pickup element according to claim 6, wherein said pixel controlling means includes
first transfer controlling means for operating said transfer circuit during a predetermined period, and
second transfer controlling means for extending the operation of said transfer circuit beyond said predetermined period when a signal charge quantity transferred to said floating diffusion region during said predetermined period is larger than a reference quantity, while inactivating said transfer circuit at the end of said predetermined period when said transferred signal charge quantity is not larger than said reference quantity.

8. The solid-state image pickup element according to claim 7, wherein said transfer circuit has a transfer gate and an auxiliary transfer gate connected in parallel between said light detector element and said floating diffusion region,
said first transfer controlling means keeps on said transfer gate during said predetermined period, and
said second transfer controlling means keeps on said auxiliary transfer gate for a certain period after said predetermined period when the signal charge quantity transferred during said predetermined period is larger than said reference quantity.

9. The solid-state image pickup element according to claim 7, wherein said transfer circuit has a transfer gate connected between said light detector element and said floating diffusion region,
said first transfer controlling means keeps on said transfer gate during said predetermined period, and
said second transfer controlling means keeps on said transfer gate for a certain period after said predetermined period when the signal charge quantity transferred during said predetermined period is larger than said reference quantity.

10. The solid-state image pickup element according to claim 7, wherein
said second transfer controlling means determines whether or not the signal charge quantity transferred during said predetermined period is larger than said reference quantity, based on a potential of said floating diffusion region during said predetermined period.

11. The solid-state image pickup element according to claim 7, wherein
said pixel circuit further includes an amplifier generating an electric signal according to the signal charge quantity of said floating diffusion region when operated,
said amplifier is configured to be operated during said predetermined period, and
said second transfer controlling means determines whether or not the signal charge quantity transferred during said predetermined period is larger than said reference quantity, based on said electric signal from said amplifier during said predetermined period.

12. The solid-state image pickup element according to claim 10 further comprising:
a pixel array having a plurality of said pixel circuits; and
a data line for reading an output from each said pixel circuit, wherein
each said pixel circuit further includes an amplifier generating an electric signal according to the signal charge quantity of said floating diffusion region when operated, and a pixel selector switch element arranged between said amplifier and said data line,
said plurality of pixel circuits are divided into a plurality of groups, and said pixel controlling means is provided corresponding to each of said groups in an external region of said pixel array,
said solid-state image pickup element further comprises:
a first switch element arranged between said transfer circuit in each said pixel circuit and said pixel controlling means corresponding thereto, and
a second switch element arranged between said floating diffusion region in each said pixel circuit and said pixel controlling means corresponding thereto,
said first and second switch elements are controlled so as to sequentially connect, in each of said groups, one of said pixel circuits selected from the group to said pixel controlling means and
said second transfer controlling means determines whether or not the signal charge quantity transferred during said predetermined period is larger than said reference quantity, based on a potential of said floating diffusion region connected through said second switch element.

13. The solid-state image pickup element according to claim 11 further comprising:
a pixel array having a plurality of said pixel circuits; and
a data line for reading an output from each said pixel circuit, wherein
each said pixel circuit further includes a pixel selector switch element arranged between said data line and said amplifier,
said plurality of pixel circuits are divided into a plurality of groups, and said pixel controlling means is provided corresponding to each of said groups in an external region of said pixel array,
said solid-state image pickup element further comprises a first switch element arranged between said transfer circuit of each said pixel circuit and said pixel controlling means corresponding thereto,
said first switch element is controlled to sequentially connect, in each of said groups, one of said pixel circuits selected from the group to said pixel controlling means, and
said second transfer controlling means determines whether or not the signal charge quantity transferred during said predetermined period is larger than said reference quantity, based on said electric signal outputted from said amplifier to said data line.

14. The solid-state image pickup element according to claim 6, wherein
said solid-state image pickup element comprises a plurality of said pixel circuits, and
said pixel controlling means controls said transfer circuit so as to extend said operation period commonly to said plurality of pixel circuits when a light receiving level of the whole pixel circuits is not lower than a predetermined level, while controlling said transfer circuit so as not to extend said operation period when said light receiving level is lower than the predetermined level commonly to said plurality of pixel circuits.

15. The solid-state image pickup element according to claim 14, further comprising an operation switch for designating whether or not said light receiving level is not lower than said predetermined level, wherein
said pixel controlling means determines whether or not the light receiving level of the whole pixel circuits is lower than said predetermined level, based on whether or not there is an input to said operation switch.

16. The solid-state image pickup element according to claim 14, wherein said pixel controlling means determines whether or not the light receiving level of the whole pixel circuits is lower than said predetermined level, based on an output from said plurality of pixel circuits at the time just before image pickup by said solid-state image pickup element.

* * * * *